United States Patent [19]
Tanno et al.

[11] Patent Number: 5,208,972
[45] Date of Patent: May 11, 1993

[54] APPARATUS FOR ASSEMBLING RING-SHAPED ARTICLES

[75] Inventors: Shogo Tanno, Itami; Toru Kashioka, Moriguchi; Etsuro Mamishin; Kenji Kawamura, both of Nishinomiya, all of Japan

[73] Assignees: Mitsubishi Cable Industries, Ltd., Amagasaki; Nippon Reinz Co., Ltd., Yamato, both of Japan

[21] Appl. No.: 794,246

[22] Filed: Nov. 19, 1991

[30] Foreign Application Priority Data

Nov. 21, 1990 [JP]  Japan .................................. 2-316632
Nov. 21, 1990 [JP]  Japan .................................. 2-316633

[51] Int. Cl.$^5$ ............................................. B23P 21/00
[52] U.S. Cl. ........................................ 29/788; 29/810; 29/822; 29/243.517
[58] Field of Search ............... 29/771, 783, 786, 788, 29/791, 793, 796, 810, 818, 822, 222, 243.5, 243.517, 283.5; 414/751, 225; 901/6

[56] References Cited

U.S. PATENT DOCUMENTS 3,737,967  6/1973  Pommier .......................... 29/283.5
3,745,634  7/1973  Vargo .............................. 29/243.517

FOREIGN PATENT DOCUMENTS 121900  10/1984  European Pat. Off. ........ 29/243.517

Primary Examiner—P. W. Echols
Assistant Examiner—David P. Bryant
Attorney, Agent, or Firm—Beveridge, DeGrandi, Weilacher & Young

[57] ABSTRACT

Apparatus for assembling a grommet and a wire ring for forming a peripheral reinforcement of an engine head gasket opening. Grommets and wire rings are supplied one by one on different supply devices and retained at first and second article retaining positions, respectively. A movable head moves toward the second retaining position and picks up a wire ring. The head then conveys the wire ring to the second retaining position, where the wire ring is placed overlappingly on the grommet. Thereafter, another movable head having a deforming die is moved against the overlapped grommet and wire ring and deforms a flange of the grommet radially outwardly, whereby the grommet prevents separation of the wire ring therefrom. The thus assembled grommet and wire ring are conveyed to a machine for attaching them to the gasket.

23 Claims, 23 Drawing Sheets

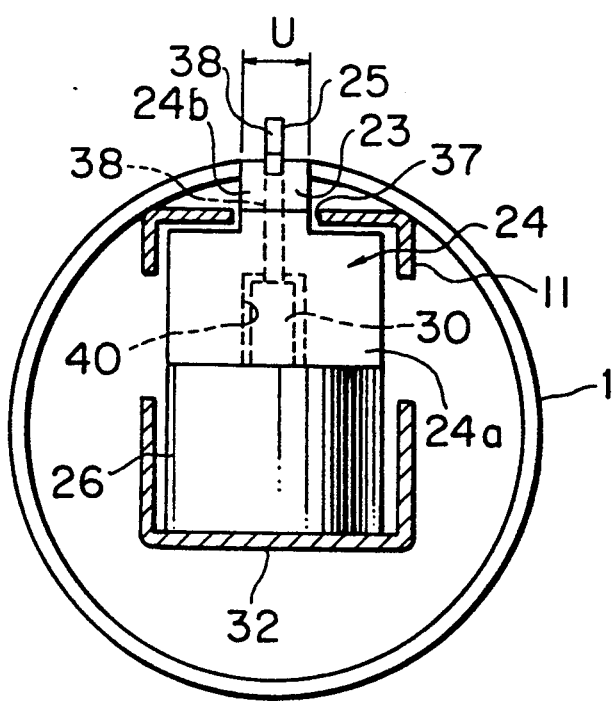
FIG. 9
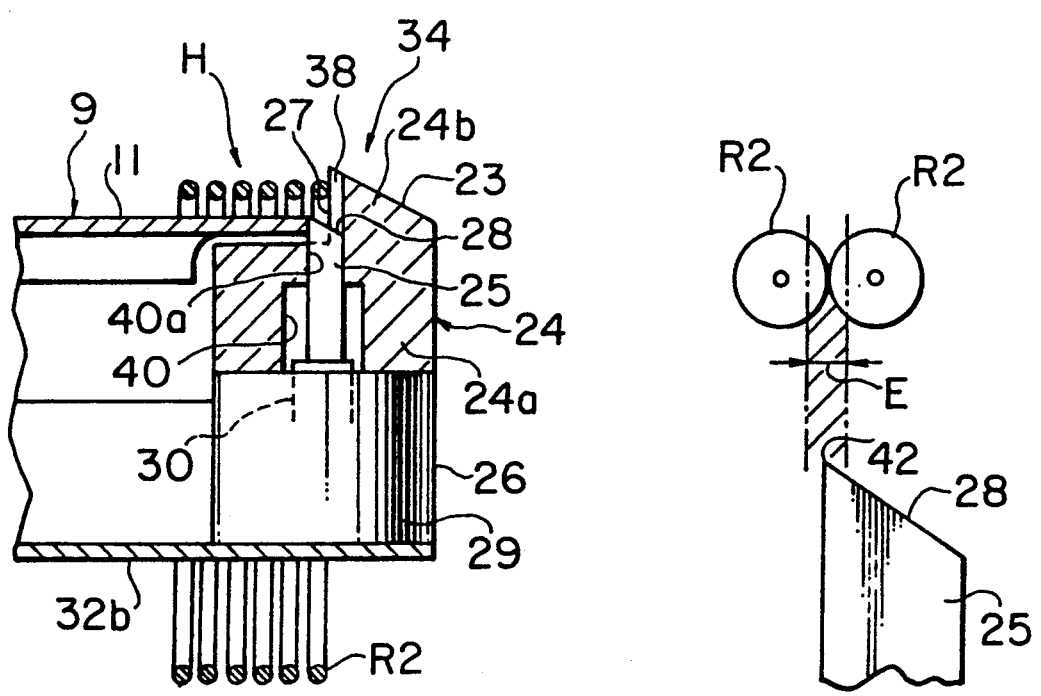
FIG. 10
FIG. 11

APPARATUS FOR ASSEMBLING RING-SHAPED ARTICLES

BACKGROUND OF THE INVENTION

This invention relates to an apparatus for assembling ring-shaped articles, and, more particularly, to an apparatus for assembling a first ring-shaped article with a second ring-shaped article in an inseparable, mutually engaging manner preparatory to a final assembly of the two articles. The first ring-shaped article is, for example, a grommet and the second ring-shaped article is, for example, a wire ring. These grommet and wire ring are inseparably semi-assembled, preparatory to a final assembly for attaching them to the peripheral portion of an opening of an engine head gasket.

Gaskets are used in the engine head for automobiles. The engine head gaskets have an opening or openings corresponding to the engine cylinder bore or bores. The periphery of each opening of the gasket needs to be protected by a combination of a grommet and a wire ring. The wire ring is enclosed in a grommet that is bent to have a U-shaped cross section. By placing the wire ring in the grommet attached to the periphery of the gasket opening, the grommet is reinforced and becomes capable of maintaining its shape.

Heretofore, before attaching the combined grommet and the wire ring, the grommet and wire ring were prepared separately and conveyed to a place where the grommet and the wire ring were assembled manually, that is, the wire ring was manually put on the grommet. Thereafter, the combined grommet and wire ring were transferred to a machine where the combined grommet and wire ring were processed to be attached to the periphery of the opening of a gasket.

However, the manual operation of combining the grommet and the wire ring was time-consuming and not efficient. Moreover, during the transfer, once combined grommet and wire ring were sometimes separated.

SUMMARY OF THE INVENTION

It is therefore an object of the present invention to provide an apparatus for automatically supplying ring-shaped articles, such as grommets and wire rings, and assembling the ring-shaped articles to form inseparable pairs of the articles which can be transferred to a machine for attaching each pair of the articles to another article such as a gasket.

According to this invention, there is provided an apparatus for assembling ring-shaped articles comprising: means for supplying first ring-shaped articles one by one to a first delivery end; means for supplying second ring-shaped articles one by one to a second delivery end; first article holding means disposed adjacent to the first delivery end for receiving and retaining thereon first ring-shaped articles one at a time; second article holding means disposed adjacent to the second delivery end for receiving and retaining therein second ring-shaped articles one at a time; head means movable between the second and first article holding means for picking up the second ring-shaped article on the second article holding means to transfer the second article so as to place the same onto the first ring-shaped article on the first article holding means in concentrically overlapping relation; and die means movable toward and away from the first article holding means for acting upon the overlapped first and second ring-shaped articles on the first article holding means to deform one of the overlapping articles so as to cause one article to engage the other article, thereby producing an inseparable pair of the first and second articles. In the present application "ring-shaped" is used in the broad sense to include the typical circular band of material as well as configurations comprising a plurality of adjoined circular bands joined together (i.e., the combination being "ring-shaped") and configurations which are other than purely circular but define a band of material separating an aperture or apertures from an external area bordering the outside edge of the band.

Some embodiments of this invention will now be described in detail with reference to the accompanying drawings.

BRIEF DESCRIPTION OF THE DRAWINGS

FIG. 9 is an end view, in vertical section, of the apparatus of FIG. 8;

FIG. 10 is a fragmentary enlarged view, similar to FIG. 8, but showing a different state of operation;

FIG. 11 is a view for describing the operation of a push-up bar;

DESCRIPTION OF THE PREFERRED EMBODIMENTS

The apparatus for assembling ring-shaped parts or articles according to this invention handles two kinds of articles, i.e., a first ring-shaped article and a second ring-shaped article. The first ring-shaped article is, for example, grommet, and the second ring-shaped article is, for example, a wire ring. The grommet and wire ring are assembled together to form a part of an engine head gasket of a motor vehicle.

Figure 42A:
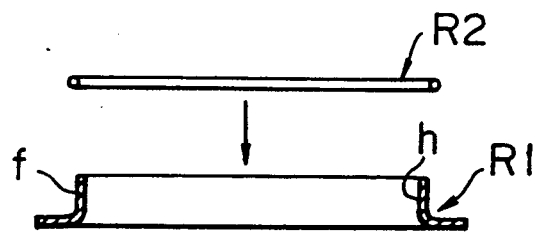
FIGS. 42A through 42D show successive process steps of assembling first and second ring-shaped articles.
Figure 42B:
Figure 42C:
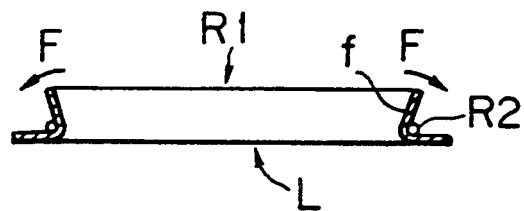
Figure 42D:
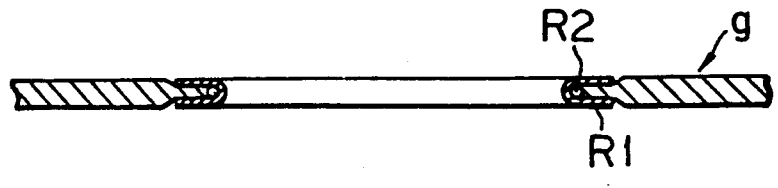

As shown in FIG. 42D, an engine head gasket g has an opening. To the peripheral edge of the opening is secured a grommet R1 which is deformed in U-shape in cross section as shown. A wire ring R2 is inserted in the grommet R1 for purposes of reinforcement and shape retention of the gasket. Before being supplied to the apparatus of this invention, the grommet (first ring-shaped article) R1 has a shape shown in FIG. 42A. That is, the grommet R1 is in the form of an annular member of L-shaped cross section, having an upstanding annular flange f defining a cylindrical opening h. The grommet R1 shown in FIG. 42A is obtained by stamping and pressing a thin stainless steel sheet. On the other hand, the wire ring (second ring-shaped article) R2 is obtained by curving or rounding a steel wire to form a closed ring and then joining the ends of the wire as by welding.

The apparatus of this invention carries out process steps shown in FIGS. 42A to 42C. That is, the grommet R1 is placed on a support, and then the wire ring R2 is dropped from above onto the grommet R1 as indicated by arrow in FIG. 42A. As a result, the wire ring R2 is placed on the grommet R1 as shown in FIG. 42B. Thereafter, the flange f of the grommet R1 is bent radially outward as indicated by arrow F in FIG. 42C whereby an assembly L is obtained which is in a semi-assembled state in which the grommet R1 and the wire ring R2 are prevented from being separated from each other. Thus, this semi assembly can be conveyed without separation to a subsequent processing machine in which the semi-assembly is processed to be attached to the gasket g as shown in FIG. 42D.

The apparatus according to this invention operates to supply the grommets R1 and the wire rings R2 in succession and to carry out the steps shown in FIGS. 42A to 42C.

FIGS. 1 to 17, inclusive, show apparatus for supplying the grommets and the wire rings in succession to another apparatus for carrying out the steps shown in FIGS. 42A to 42C. In the following description, the grommet will be referred to as a first ring-shaped article, and the wire ring as a second ring-shaped article. Furthermore, the grommet or the wire ring will generally be referred to as a ring-shaped article.

Figure 1:
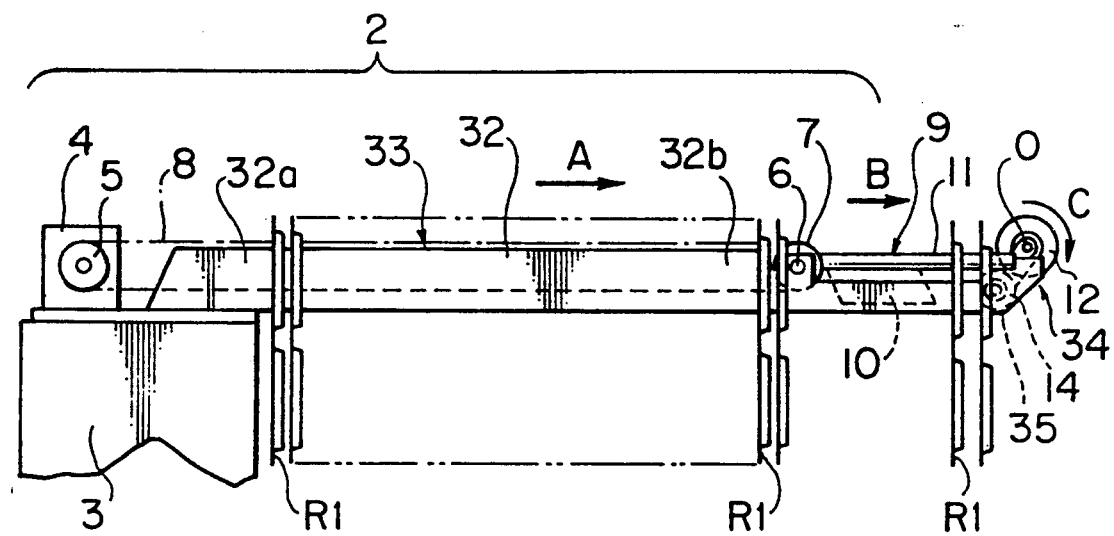
FIG. 1 is a front view of an apparatus for supplying ring-shaped articles, which can be used in the apparatus for assembling ring-shaped articles according to this invention.

FIG. 1 shows an apparatus for supplying ring-shaped articles. The apparatus has a horizontally extending storage hanger 2 for storing a plurality of ring-shaped articles R1 in a hung state. The storage hanger 2 comprises a cantilevered horizontal arm 32 extending toward the right as viewed with its left proximal end 32a fixedly secured to a pedestal 3, and a conveyor device 8 which conveys the ring shaped articles R1 in the horizontal direction, that is, in the direction of arrow A.

The conveyor device 8 is constituted by an electric motor 4, a driving wheel 5 in the form of a sprocket wheel or a pulley, an idle wheel 7 rotatably supported by a horizontal shaft 6 near the righthand end of the horizontal arm 32, an endless transfer means 33 passing about both the wheels 5 and 7. When the motor 1 is intermittently operated, a plurality of ring-shaped articles R1 are conveyed in the direction of the arrow A from the left end 32a to the right end 32b of the horizontal arm 32.

The apparatus for supplying ring-shaped articles R1 further comprises a rectilinear feeder 9 provided adjacent the distal or righthand end of the storage hanger 2, and a delivery device 34 provided adjacent the righthand end of the rectilinear feeder 9.

The rectilinear feeder 9 applies vibration to the ring-shaped articles supplied from the conveyor device 8 and sends the articles R1 toward the right, that is, in a direction B. The rectilinear feeder 9 comprises a vibrator 10, and a feeder plate 11 which is mounted thereon and is secured to the distal end of horizontal arm 32.

Figure 2:
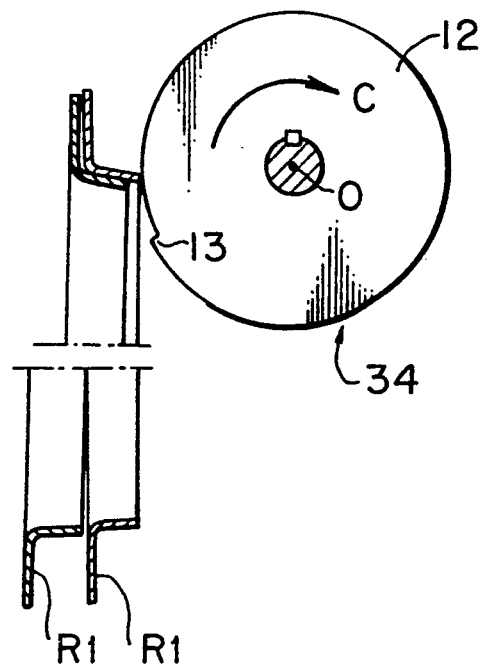
FIG. 2 is an enlarged view of a circular disc and ring-shaped articles, which are shown in FIG. 1.

As shown in FIGS. 1 and 2, the delivery device 34 comprises a circular disc 12 having on its outer periphery a notch 13 for engaging or catching ring-shaped articles R1 one after another; the circular disc 12 being rotatable about a horizontal axis O, and driving means 35 driven by a motor 14 for rotating the circular disc 12. More particularly, the circular disc 12 has the sharp notch 13 suitable for use to engage a ring-shaped article R1 in the form of a grommet having a L-shaped cross section, as shown in FIG. 2. FIG. 2 shows a state in which a number of grommets, that is, ring-shaped articles R1 are temporarily stacked one upon another. As above described, by constructing the notch 13 to be sharp and by making extremely small the depth of the notch 13 corresponding to the thickness of each grommet R1, it becomes possible to pick up, one after another, a single grommet and rotate it in the direction of an arrow C and then to drop it on the righthand side. The circular disc 12 is provided at the righthand end of horizontal arm 32, as will be described later in more detail with reference to a modification shown in FIG. 3.

Figure 3:
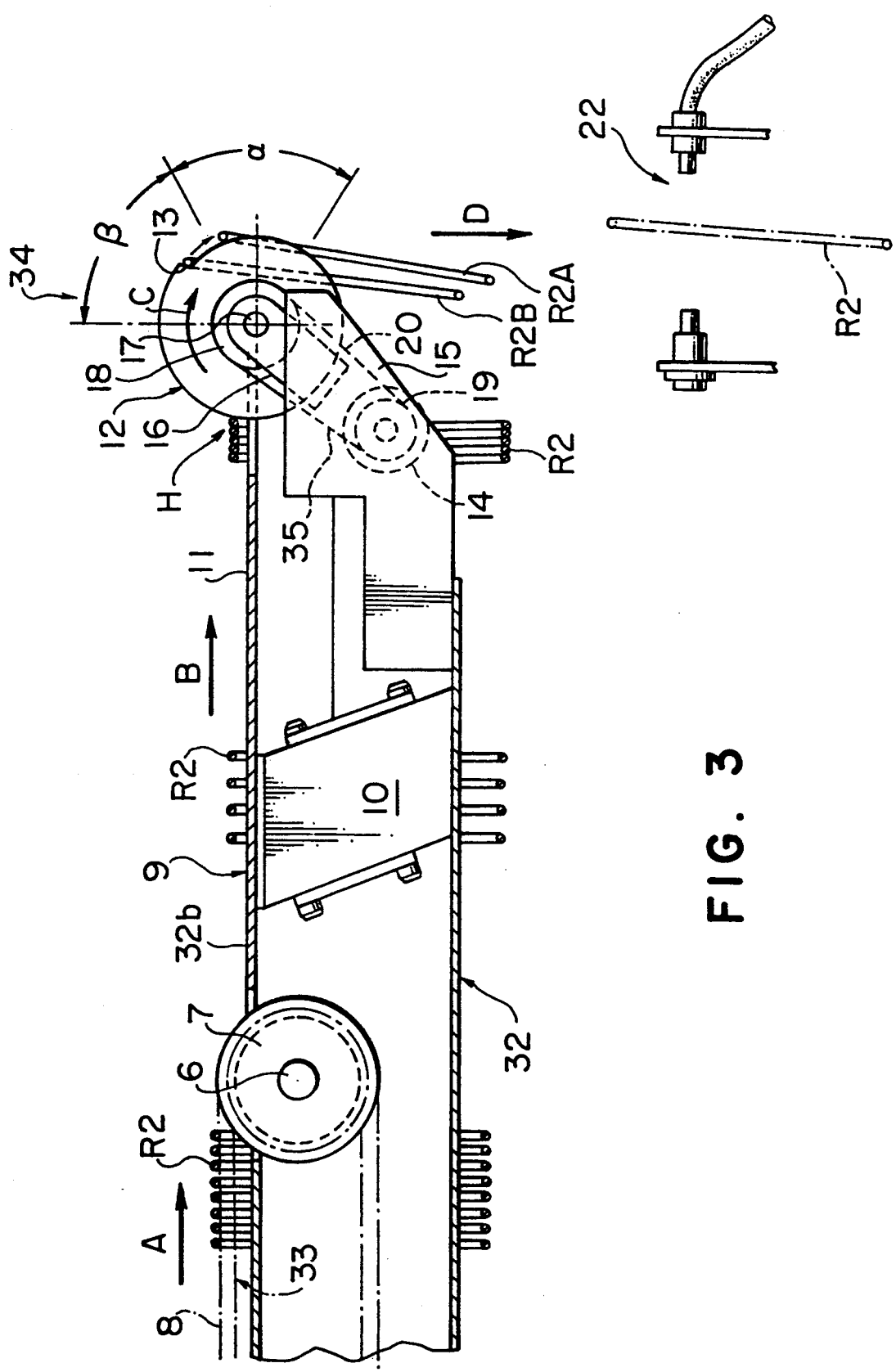
FIG. 3 is an enlarged front view, partly in section, showing a modified apparatus for supplying ring-shaped articles.

FIG. 3 is an enlarged view of important parts shown in FIG. 1, but the circular disc 12 is shown to have a construction slightly different from that shown in FIG. 1. Furthermore, the articles are second ring-shaped articles R2. More particularly, the delivery device 34 shown in FIG. 3 is adapted for the second ring-shaped articles, that is, wire rings R2 which are to be assembled with the grommets in a later processing step as described previously.

Figure 4:
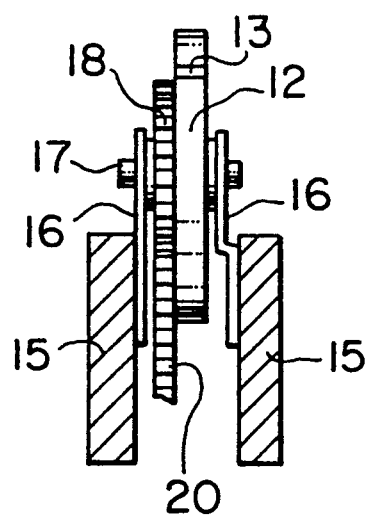
FIG. 4 is an end view of FIG. 3, as viewed from the right in FIG. 3.

As shown in FIGS. 3 and 4 which is an end view as seen from the right of FIG. 3, a holding device H for temporarily storing an appropriate number of ring-shaped articles R2 is provided on the distal end of the rectilinear feeder 9 near the circular disc 12. A pair of opposite plate members 15 are provided in parallel for constituting the foremost end of the horizontal arm 32, and a small synchronous motor 14 is mounted therebetween. Further, a pair of mounting pieces 16 are provided to extend above the plate members 15 so as to rotatably support a shaft 17 of the circular disc 12. Pulleys 18 and 19 are respectively secured to the shaft 17 and the motor 14, and an endless belts 20 such as toothed belts are passed about the pulleys 18 and 19 for rotating the circular disc 12 in the direction of the arrow C. More particularly, the driving means 35 is constituted by the small motor 14, the pulleys 18, 19 and the endless belts 20. As the driving means 35 there may be used a combination of a reciprocating cylinder and a tie rod, or a combination of a tie rod and a link interconnecting the pulleys 18 and 19.

Although not shown in FIGS. 1 and 3, it is advantageous to provide between both wheels 5 and 7 chain holders or guide wheels slightly projecting beyond the upper surface of the horizontal arm 32 for supporting the conveyor 8. Further, as a conveyor device 8 for ring-shaped shaped articles, there may alternatively be used a pusher operated for reciprocation by a pneumatic cylinder.

Although not shown in FIG. 3, for the purpose of limiting the number of ring-shaped articles stored in the holder device H on the rectilinear feeder plate 11, it is advantageous to use a sensor for detecting the number of ring-shaped articles. In other words, when the sensor for detecting the number of ring-shaped articles does not detect any ring-shaped article, the conveyor device 8 is operated only for a short time, for example, 0.2 second so as to issue a signal such that only several ring-shaped articles are sent onto the rectilinear feeder 9. On the other hand, when the sensor detects the presence of ring-shaped articles for a predetermined time, the conveyor device 8 is stopped, and a signal is issued for stopping transfer of the ring-shaped articles to the rectilinear feeder 9. In this manner, the holder H can hold a required number of ring-shaped articles.

In the path of dropping the ring-shaped articles from the circular disc 12 in a direction shown by arrow D, a detector 22 is provided to perform a function to be described later.

Figure 5:
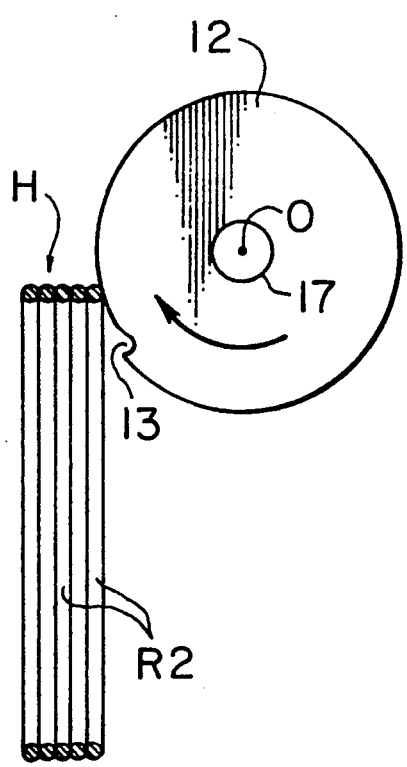
FIGS. 5 and 6 are partial views for explaining the operation.
Figure 6:
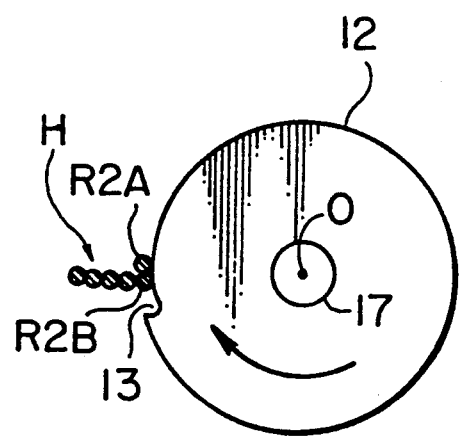
Figure 7:
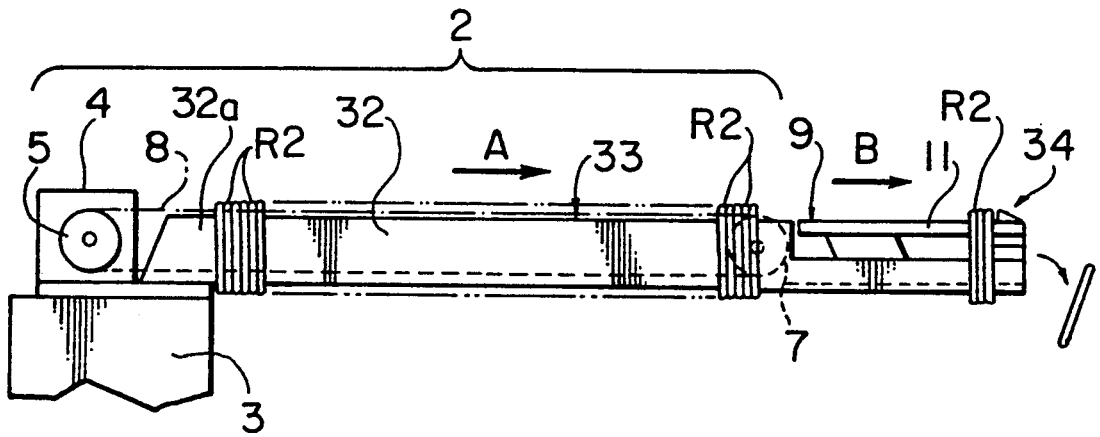
FIG. 7 is a front view showing another apparatus for supplying ring-shaped articles.

As shown in FIGS. 5 and 6, when the ring-shaped article 1 takes the form of a wire ring having a circular cross-section, the notch 13 is formed to have a configuration of a small arc so as to accurately engage and raise the ring-shaped articles 1.

As shown in FIG. 5, the ring-shaped articles to be conveyed are generally arranged in line on the rectilinear feeder 9 and are not overlapped one upon the other. However, where a great many number of articles are supplied, a ring-shaped article R2A often overlaps on a succeeding one of the articles R2B, as shown in FIG. 6. As shown in FIG. 3, under these conditions, even in an angular range $\beta$ preceding an angular range E in which the notch 13 is positioned so as to allow the ring-shaped articles to drop, the overlapped ring-shaped article R2A will begin to drop erroneously.

The detector 22 detects such erroneously dropped ring-shaped article R2A and issues a signal that immediately stops the small motor 14. If this motor is a pulse motor, it is possible to detect whether the position of the notch 13 is within the angular range $\alpha$ (FIG. 3) or $\beta$. Therefore, by rendering the detector 22 operative only during the angular range $\beta$, the overlapping ring-shaped article R2A can be detected.

The magnitudes and orientations of the angular range $\alpha$ and $\beta$ are predetermined by taking into consideration the size, and configuration and allowable tolerance of the dimension of the notch 13, as well as the shape and the allowable tolerance of the dimension of the ring-shaped articles.

It will be apparent that the number of the notches 13 may be two or more.

A modification of the ring-shaped article supply apparatus will be described with reference to FIGS. 7 to 11 in which wire rings R2 are used as the ring-shaped articles. Also in this modification, there are provided a horizontal ring-shaped article storing hanger 2, a rectilinear feeder 9 and a delivery device 34.

Figure 8:
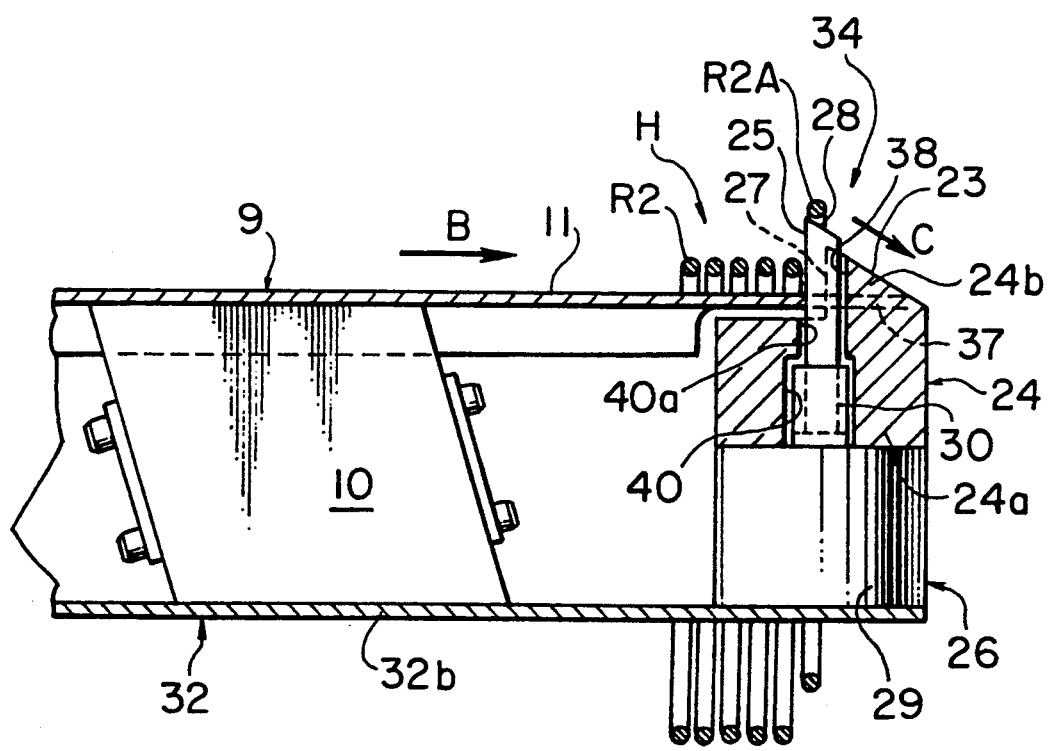
FIG. 8 is an enlarged front view, partly in section, showing an important part of FIG. 7.
Figure 12:
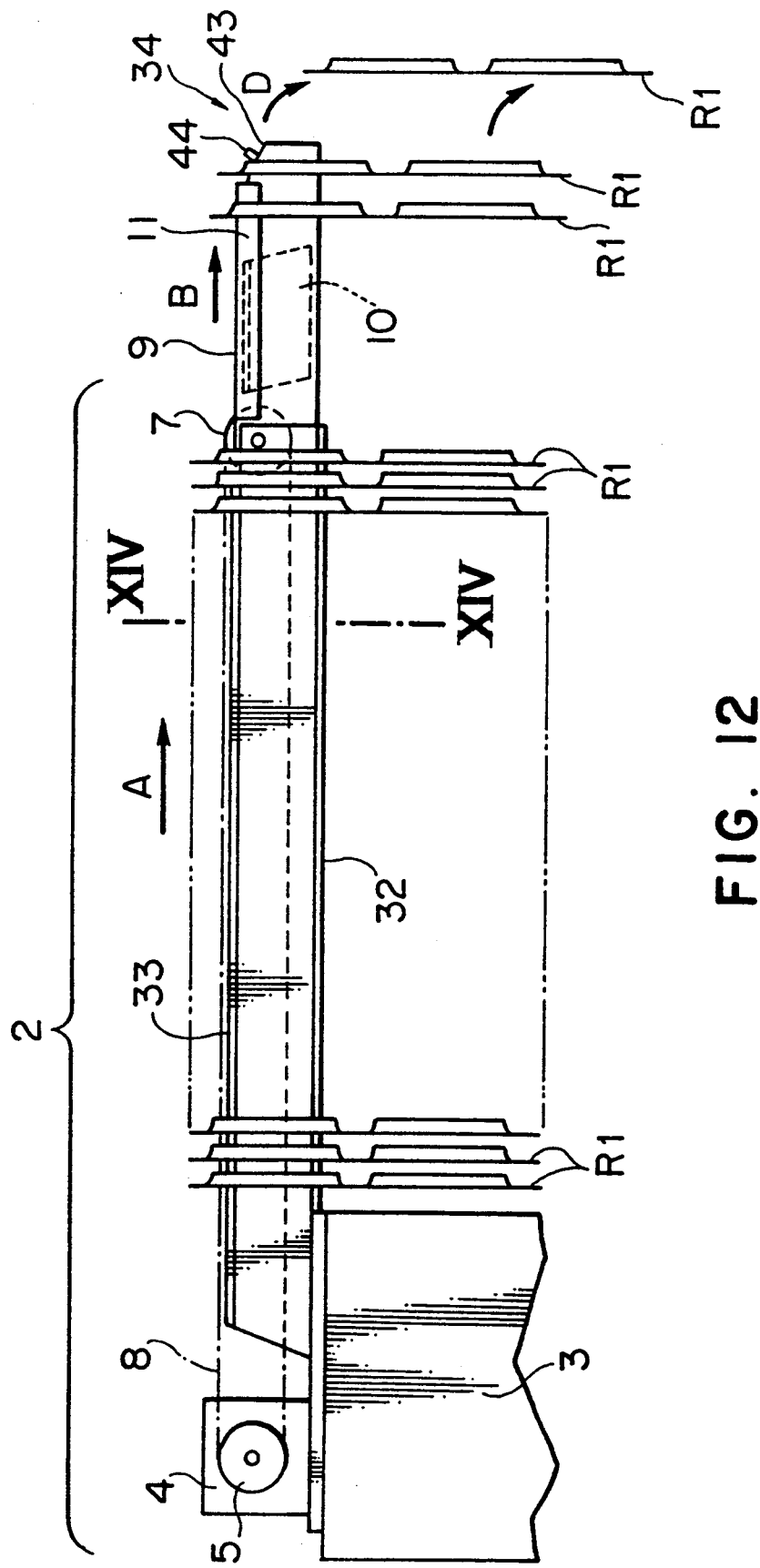
FIG. 12 is a front view showing a modified apparatus for supplying ring-shaped articles.

As shown in FIGS. 8 and 9, the horizontal arm 32 is constituted by a rectangular/cylindrical member; and an upper half of its outer (right) end is cut out to have a U-shaped configuration, and an inverted U-shaped plate 11 of the rectilinear feeder 9 is secured to the cut-out portion.

As indicated in FIGS. 8 and 10, the delivery device 34 of this modification has a stop member 24 projecting upwardly for stopping ring-shaped articles R2 supplied from the rectilinear feeder 9. The stop member 24 has a downwardly inclined upper surface 23. The delivery device 34 further has a push-up bar 25 which raises once stopped ring-shaped articles R2, one after another, to cause the raised article to slide down along the inclined surface 23 and driving means 26 for reciprocating the projecting bar 25 in the vertical direction. The push-up bar 25 extends through the stop member 24.

The push-up bar 25 is free to move in the vertical direction along a vertical surface 27 of the stop member 24. The upper surface of the push-up bar 25 has also a downwardly inclined top surface 28.

As the driving means 26 can be used a pneumatic cylinder which is constituted by a cylinder 29, a piston rod 30 and a piston (not shown), the cylinder 29 being secured to the foremost bottom wall of the horizontal arm 32. The stop member 24 is in the form of a block and is secured to the upper surface of the cylinder. The stop member 24 includes substantially square base portion 24a and an inclined roof-shaped protrusion 24b having a width U (FIG. 9). In other words, the upper surface of the protrusion 24b forms the inclined surface 23 described above.

At the center of the forward end of the plate 11 is formed a slot 37 and the protrusion 24b extends through this slot 37 to project upwardly.

The vertical surface, which faces feeder 9, of the protrusion 24b corresponds to the vertical surface 27 so that the vertical surface 27 comes into direct contact with ring-shaped articles R2 so as to form a holder device H in the same manner as in FIG. 3, thus holding an appropriate number of the ring-shaped articles R2.

A guide groove 38 having a width smaller than the width U is cut vertically in the vertical surface 27. The guide groove 38 is formed to be continuous with a small square opening 40a above a stepped opening 40 formed through the base portion 24a. The push-up bar 25 is slidably fitted in the small square opening 40a and the guide groove 38.

More particularly, the push-up bar 25 is reciprocated in the vertical direction by the driving means 26 so as to move along the vertical surface 27 of the stop member 24. As shown in FIGS. 8 and 10, the push-up bar 25 is moved up to a level slightly above the inclined surface 23 for individually raising a ring-shaped article R2A so as to permit the article R2A to slide down along the inclined surface 23 to be received by a chute, not shown, thereby supplying the ring-shaped article to the apparatus of a succeeding step.

More particularly, in a case where the driving means 26 takes the form of a pneumatic cylinder, the push-up bar 25 is secured to the piston rod. A downwardly inclined surface 28 is formed on the upper surface of the push-up bar 25, and the highest edge 42 of the inclined surface 28 is positioned within a narrow range E between the first and second ring-shaped articles as shown in FIGS. 10 and 11. Therefore, the first and second ring-shaped articles are accurately separated during the upward stroke of the push-up bar 25 in such a manner that only the leading ring-shaped article R2A is raised by the bar 25 as shown in FIG. 8. Then, the ring-shaped article thus raised will automatically slide down by its own weight as shown by arrow C in FIG. 8.

It is advantageous also in this modification to install a sensor for limiting the number of ring-shaped articles R2 to be held in the holder device H at the forward end of the rectilinear feeder 11. In other words, when the sensor does not detect a ring-shaped article, conveyor device 8 is operated for a short time, 0.2 second, for example, and a signal is delivered for supplying only several ring-shaped articles R2 to the rectilinear feeder 9. On the other hand, when the presence of the ring-shaped articles R2 is detected for a predetermined time length, the conveying device 8 is stopped and a signal is issued which stops the transfer of the ring-shaped articles to the rectilinear feeder 9.

As above described, only an appropriate number of ring-shaped articles R2 are held by the holder device H. This is because where many ring-shaped articles are concentrated at the forward end of the feeder plate 11, ring-shaped articles would be overlapped. The delivery device 34 is also usable for ring-shaped articles other than the wire rings shown in FIGS. 7 to 11, for example grommets or other various parts. It is also possible to use, as the driving means 26, a combination of an electric motor or a combination of an electric motor and a link mechanism.

FIGS. 12 to 17 inclusive, show still another modification of the ring-shaped article supply apparatus which is different from the foregoing apparatus in the construction of the delivery device, but the storage hanger 2 and the rectilinear feeder 9 have similar constructions as before.

Figure 15:
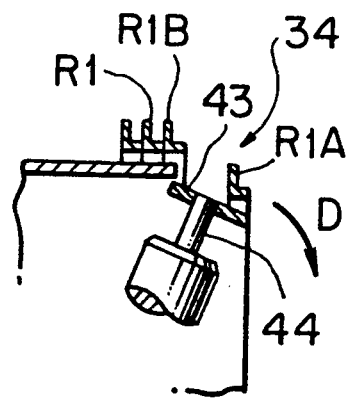
FIGS. 15 and 16 are partial views for explaining the operation of a projection rod.

The delivery device 34 will be described in detail. The delivery device 34 is provided with an inclined surface 43 for permitting the ring-shaped members R1 supplied from the rectilinear feeder 9 to slide down therealong (see arrow D shown in FIG. 12). The delivery device 34 includes projection rods 44 penetrating through the inclined surface 43, and driving means 45 for reciprocatingly moving the projection rods 44. The position of the projection rods 44 is switched by the driving means 45 between a projected position (see FIG. 13) at which the ring-shaped article R1 is arrested by the rods 44 and a retracted position permitting the ring-shaped article to slide down as shown in FIG. 15. The inclined surface 34 is constituted by an upper surface of a channel-shaped member or a rectangular plate secured to the distal end of the horizontal arm 32, or by a portion of the distal end of the horizontal arm 32.

The driving means 45 are constituted by a pneumatic cylinder and so on. In the case of a pneumatic cylinder, air pipes 46 are connected to the cylinder (see FIG. 13). Alternatively, the driving means 45 may be a combination of a motor, a cam and a spring or a combination of a motor and a link mechanism, although these members are not shown.

Figure 16:
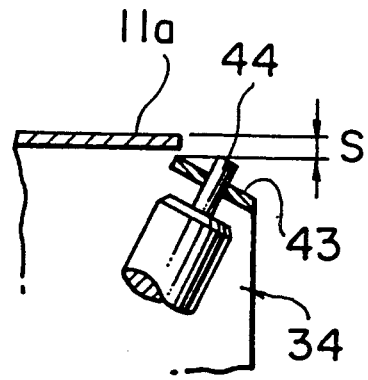
Figure 17:
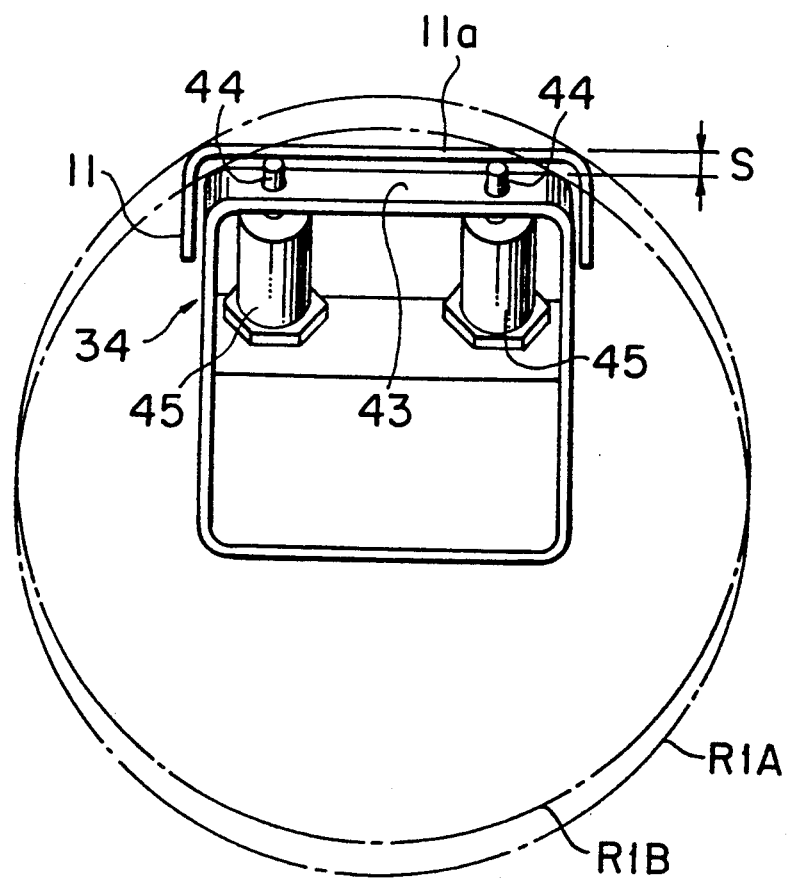
FIG. 17 is an enlarged end view as seen from the right in FIG. 13.

As shown in FIGS. 16 and 17, by positioning the highest end of the inclined surface 43 slightly below (shown by S) the upper surface of the distal or right hand end 11a of the rectilinear feeder plate 11, overlapping of a succeeding ring-shaped member R1B on a previous ring-shaped member R1A that has dropped onto the inclined surface 43 is avoided (See R1A, R1B FIG. 17). Furthermore, as can be noted from FIG. 17, the ring-shaped members are caused to slide forward while being held and guided by opposite shoulders of the rectilinear feeder plate 11 end of the inclined surface 43.

Figure 13:
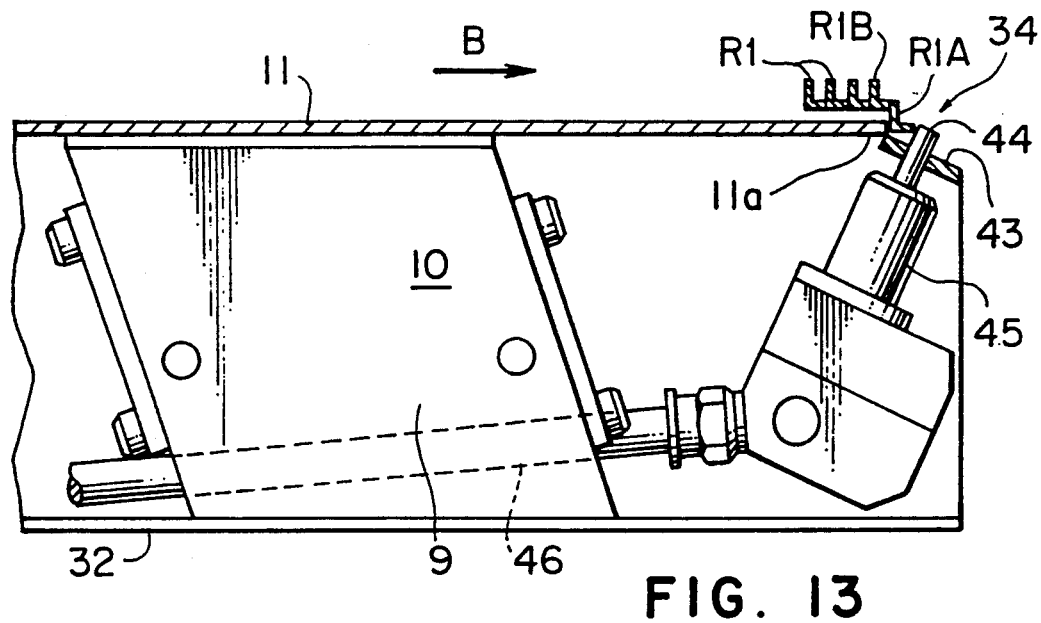
FIG. 13 is an enlarged view, partly in section, showing an important portion of the apparatus of FIG. 12.

Although not shown in the drawings, for the purpose of detecting the ring-shaped article R1A arrested and stopped by the projection rods 44, it is preferable to install a sensor device in which light is projected in a direction perpendicular to the sheet of FIG. 13 through a gap between the distal end 11a of the rectilinear feeder plate 11 and the projection rods 44, and in which the light is interrupted when there is a ring-shaped article R1A at the position of the gap.

In operation, the ring-shaped articles R1 are transferred in a direction of B (see FIG. 13) while being vibrated by a vibrator 10. In response to a signal issued by the sensor device, the operation of rectilinear feeder is stopped so as to hold or store an adequate number of the ring-shaped members R1 on the distal end 11a as shown in FIG. 13. Prior to this, the projection rods 44 have been projected by the driving means 45 so as to prevent sliding down of the ring-shaped article R1A along the inclined surface 43 by its own weight by means of the projection rods 44, now in the projected state. As a result, the ring-shaped article R1A is arrested and stopped by the projection rods 44 as shown in FIGS. 13 and 17.

Upon receiving a signal requesting the supply of the ring-shaped articles from the apparatus in the succeeding step, the projection rods 44 are withdrawn by the driving means 45 so that the ring-shaped member R1A is released, slid down and then delivered. Immediately thereafter, the projection rods 44 are projected again.

Figure 14:
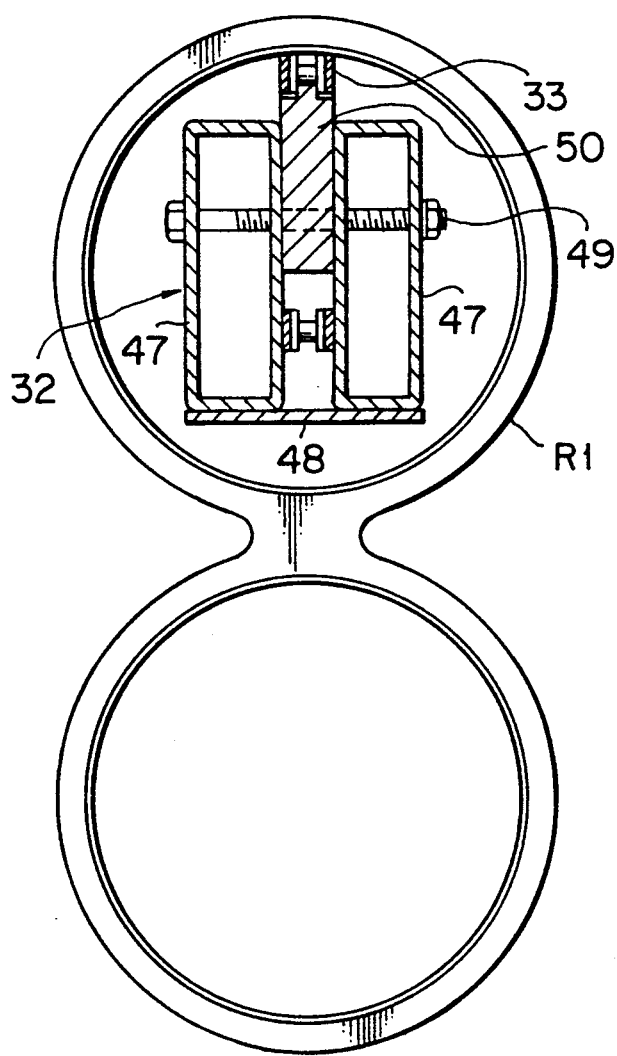
FIG. 14 is an enlarged sectional view taken along a line XIV—XIV in FIG. 12.

In this modification, the horizontal arm 32 is constituted, as shown in FIG. 14, by a pair of hollow beam members 47 of rectangular cross section, a band-shaped plate 48 which interconnects the bottom surfaces of the beam members 47 by welding, for example, and a band-shaped conveyor holder 50 inserted between the beam members 47 and secured thereto by means of a bolt and nut. The upper edge of the conveyor holder 50 projects above the beam members 47 so as to suspend the ring-shaped articles without contacting the beam members 47. Of course, the cross-sectional configuration of the horizontal arm 32 can be changed to other configurations.

It will be noted from the foregoing that the apparatus described above can accurately and reliably separate ring-shaped articles having a tendency of overlapping one upon another and can automatically supply separated ring-shaped articles individually and at high speed.

The ring-shaped articles supplied and delivered as described above are dropped onto an apparatus for semi-assembling the articles, which will be described below in detail with reference to FIGS. 18 to 25, inclusive.

Figure 19:
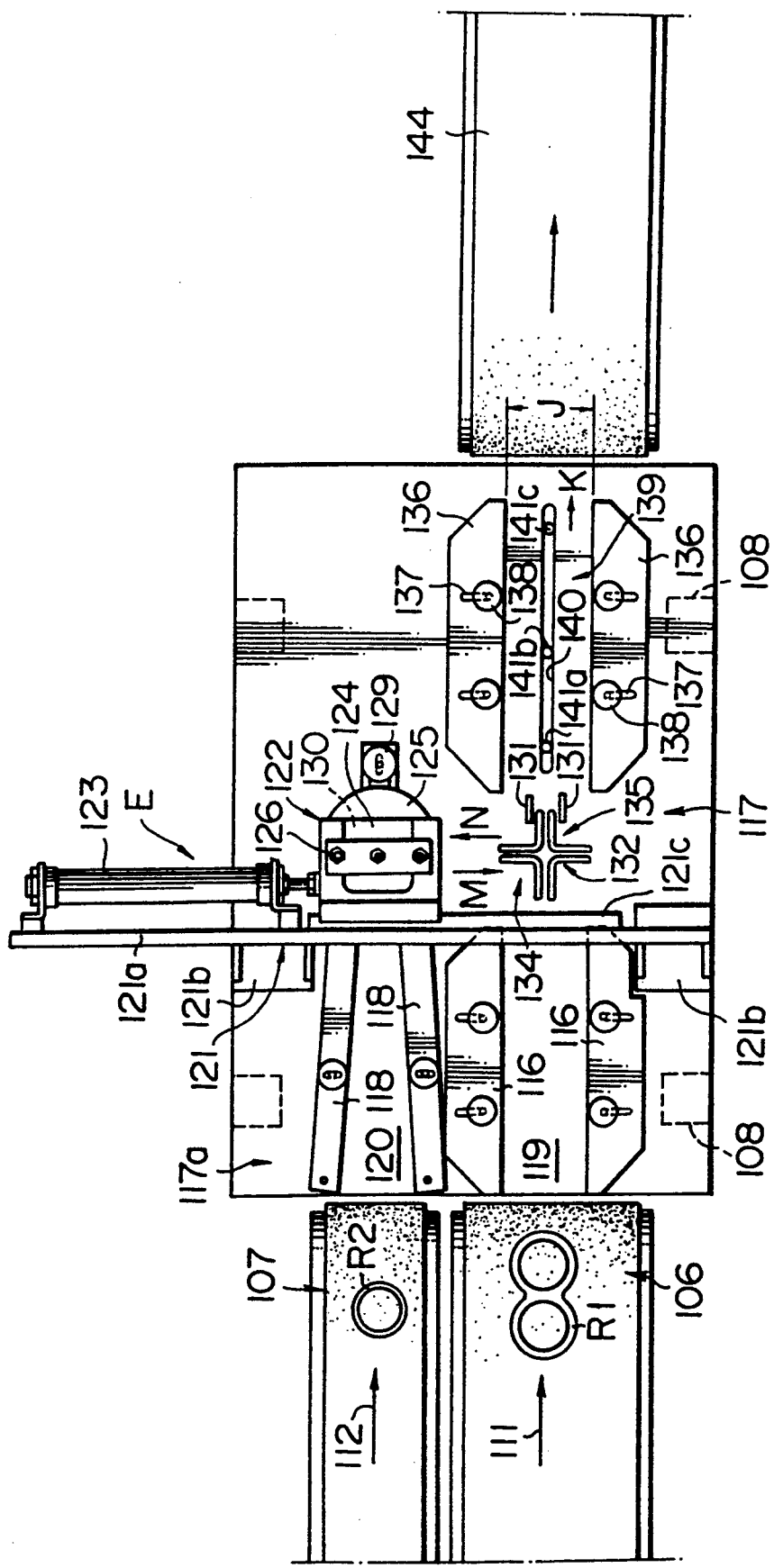
FIG. 19 is a plan view of the apparatus shown in FIG. 18, as seen in the direction of arrow XIX in FIG. 18.

As illustrated in FIG. 19 showing a plan view of the semi-assembling apparatus, there are provided a first feed device 106 for feeding first ring-shaped articles R1 and a second feed device 107 for feeding second ring-shaped articles R2. These feed devices 106 and 112 are, for example, belt conveyors and disposed in parallel arrangement. The ring-shaped articles R1 and R2 are delivered onto the feed devices 106 and 107, respectively, from the supply apparatus described before. It will be understood that any one of the supply apparatus described before may be used for delivering the first and second ring-shaped articles R1 and R2 in succession.

These first and second feed devices 106 and 107 are constructed as a pair of endless belts as also shown in FIG. 1. The upper runs of these endless belts are moved in the direction as shown by arrows 111 and 112 for feeding the first ring-shaped article R1 and the second ring-shaped article R2 to an upper edge 17a of an inclined base plate 117. The inclined plate 117 slopes downward toward a discharge end, that is toward the right as viewed in FIGS. 18 and 19, and is mounted on a support 108. The angle of inclination of the inclined plate 117 is from about 20° to 45° with respect to the horizontal, and 25° to 35° is most desirable. Adjacent the right hand ends of the first and second feed devices 106 and 107, there are provided guide members 116 and 118 on the upper surface of the inclined plate 117, so as to form a first slide-down feed passage 119 and a second slide-down feed passage 120.

Figure 18:
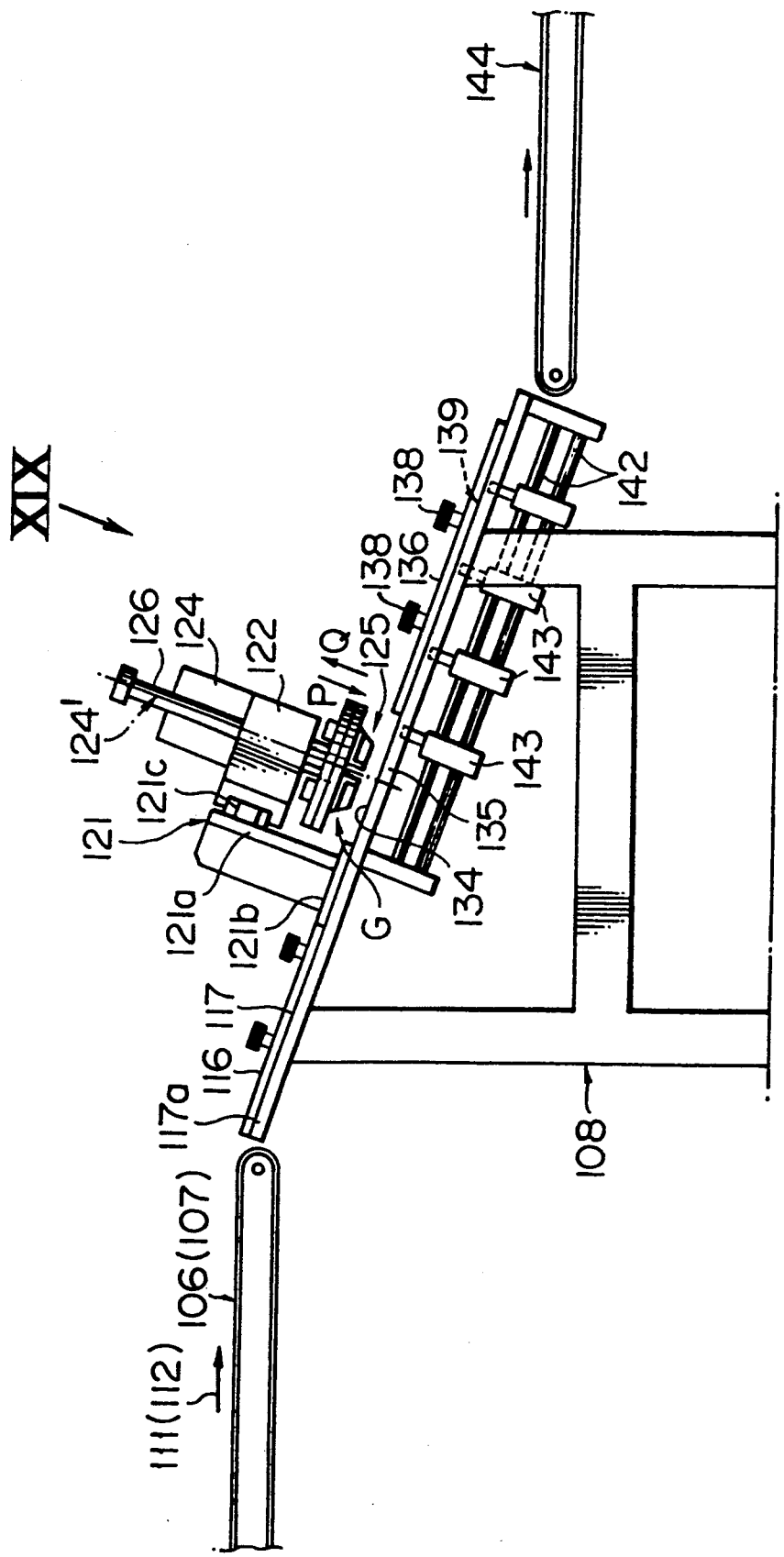
FIG. 18 is a front view showing an apparatus for semi-assembling ring-shaped articles.

A pedestal 121 is secured to the inclined plate 117 so as to extend across the righthand or downstream ends of the first and second slide-down feed passages 119 and 120. As shown in FIG. 18, the inclined plate 117 and the pedestal 121 are perpendicular to each other. The pedestal 121 is constituted by a plate 121a, the lower end of which is spaced from the inclined plate 117 with a small gap therebetween, an abutting member 121b which secures the plate 121a to the inclined plate 117, and vertically spaced parallel guide rails 121c secured to the right hand surface of the plate 121a.

Figure 20:
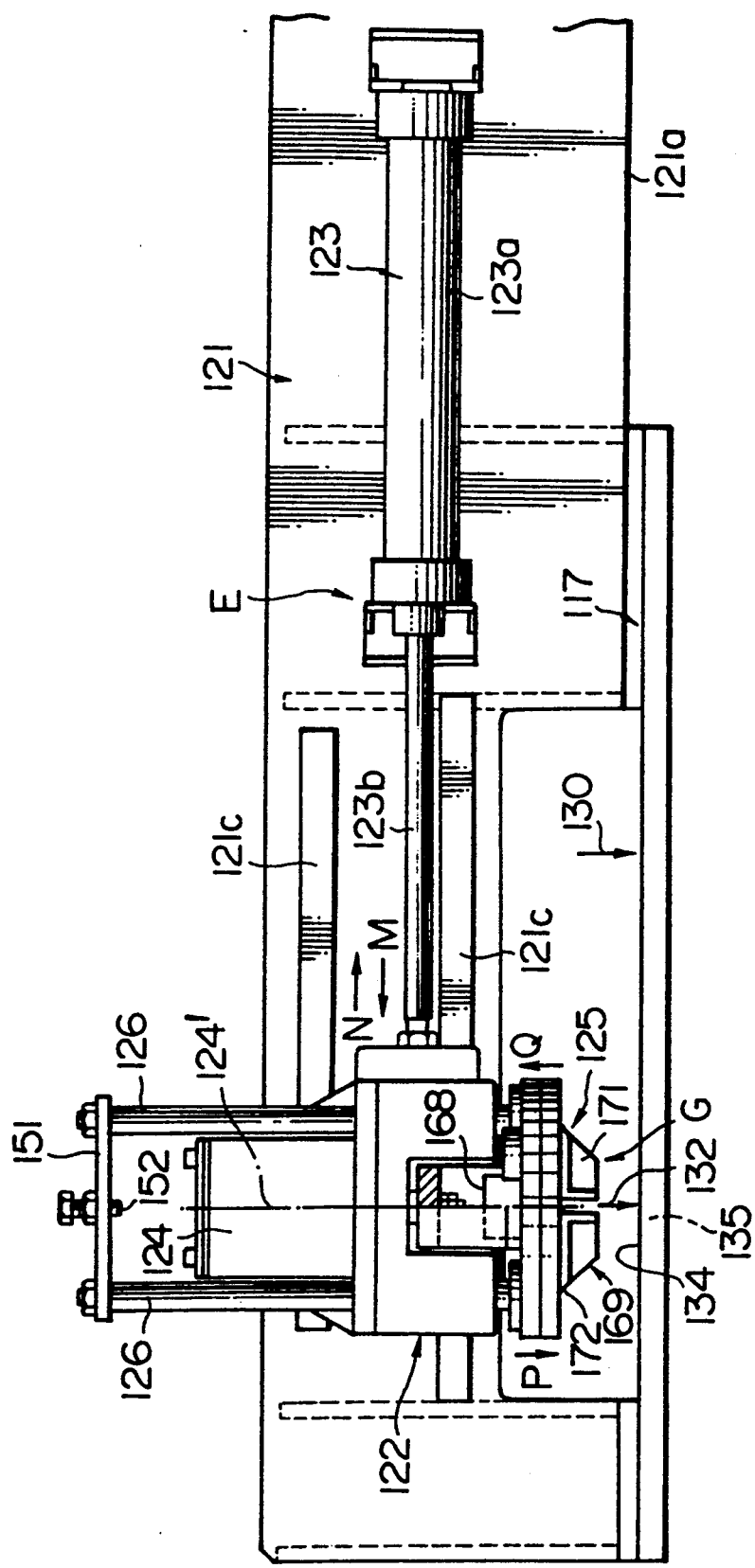
FIG. 20 is an enlarged view of essential elements of the apparatus shown in FIGS. 18 and 19.

As shown in FIGS. 18 to 20, a movable carriage 122 is supported by the guide rails 121c of the pedestal 121 to be movable transversely to the base plate 117. A pneumatic cylinder 123 is mounted on the pedestal 121, for reciprocating the carriage 112 in the directions of arrows M and N. The carriage 122 is provided with a pneumatic cylinder 124 mounted thereon, an upper die 125 secured to the lower end of a piston rod of the pneumatic cylinder 124, and guide rods 126 extending upwardly from the die 125 and slidably passing through the carriage 122 for guiding vertical reciprocating motion of the upper die 125 which is reciprocated in the directions of arrows P and Q.

In FIG. 19, a second article stop member 129 is provided to stop the second ring-shaped article R2 when it reaches a predetermined position on the upper surface of the inclined base plate 117 after passing through the second slide-down passage 120. This predetermined position is termed as a second holding position 130.

For the purpose of stopping the first ring-shaped article R1 which has reached a predetermined position on the upper surface of the inclined plate 117 after sliding down the first slide-down supply passage 119, first stopping members 131 are provided which are reciprocated in up-and-down direction so as to project from the upper surface of the inclined plate 117 or retract therefrom. This predetermined position is termed as a first holding position 132.

As above described, the first and second holding positions 132 and 130 are adapted to temporarily stop a first ring-shaped article R1 and a second ring-shaped article R2 which are fed individually. These holding positions are formed by portions of the inclined base plate 117 so that these holding positions incline toward the discharge ends.

Transfer means E is provided for the purpose of moving the second article R2 which has stopped by at second holding position 130 to the first holding position 132 and for overlapping the second article R2 on the first article R1 held at the first holding position 132. The transfer means E is constituted by the upper die 125 provided with first electromagnets 133, the pneumatic cylinder 124, the guide rods 126, the carriage 122 movable in the horizontal direction, a pneumatic cylinder 123 and the guide rails 121c.

A supporting surface 134 for supporting overlapped ring-shaped article R1 and second ring-shaped article R2 provides the first holding position 132 on the inclined base plate 117. This supporting surface 134 is also inclined, and the upper die 125 is caused to move toward and away from the supporting surface 134 as shown by arrows P and Q. The position of this supporting surface is a deforming position where the process steps shown in FIGS. 42A to 42C are carried out.

As shown in FIGS. 18 and 20, the apparatus has an article deforming device G. This deforming device G is constituted by a lower die 135 formed by the supporting surface 134 of the inclined base plate 117, and an upper die 125 reciprocated by the cylinder 124 so as to move toward and away from the lower die 135. The upper surface of the lower die 135 forms a portion of the downwardly inclined surface directed toward the discharge end. The axis 124' of the cylinder 124 is perpendicular to the upper surface of the lower die 135. In other words, the axis 124' is inclined by a predetermined angle with respect to the horizontal.

As shown in FIG. 19, a pair of guide members 136 are mounted on the upper surface of the base plate 117 together with means for adjusting the distance between the guide members 136. More particularly, the pair of guide members 136 are provided downstream of the first holding position 132, and are provided with elongated slots 137 so as to be able to adjust the spacing J between the inner edges of the guide members 136. The guide members 136 are fixed to the base plate 117 by means of fasteners 138 passed through the slots 137.

As shown in FIG. 19, an upper surface of the inclined base plate 117 interposed between the inner edges of the pair of guide members 136 forms a slide-down discharge path 139 so as to permit semi-assembled articles to slide down by its own weight as shown by arrow K. An elongated slot 140 is formed through the inclined base plate 117 at the center between the guide members 136. Stop members 141a, 141b and 141c are provided through the elongated slot 140. These stop members are reciprocated by fluid pressure cylinders, not shown, to project upward above the slot 140. As shown in FIG. 18, two slide guide rods 142 are provided at the underside of the base plate 117 and slide blocks 143 are adjustably secured to the slide guide rods 142 to be fixed or slidable. Fluid pressure cylinders are mounted to the slide blocks 143, respectively, for changing the positions of the stop members 141a, 141b and 141c. The stop members 131 described before are also reciprocated up and down by means of the slide block 143 and a fluid cylinder as will be described later.

On the downstream side of the slide-down discharge path 139 is provided discharge means in the form of an endless conveyor 144.

With reference to FIG. 20, the transfer means E and the deforming means G will be described in detail. The cylinder 123 of the transfer means E comprises a cylinder body 123a with both ends secured to the plate 121 and a piston, not shown, contained in the cylinder body 123a. The first holding position 132 and the second holding position 130 are shown by arrows. The carriage 122 is reciprocated between the holding positions 132 and 130 as shown by arrows M and N. The upper ends of the guide rods 126 are interconnected by a connecting bar 151 which has a stroke adjusting abutment member 152 made up of a bolt and a lock nut. As the piston of the pneumatic cylinder 124 is advanced or lowered, the upper die 125, the guide rods 126 and the connecting bar 151 are lowered, and the movement of the abutment member 152 and therefore the upper die 125 is stopped when the lower end of the member 152 engages the upper surface of the cylinder 124, thereby adjusting the degree of deformation effected by the upper die 125.

Figure 24:
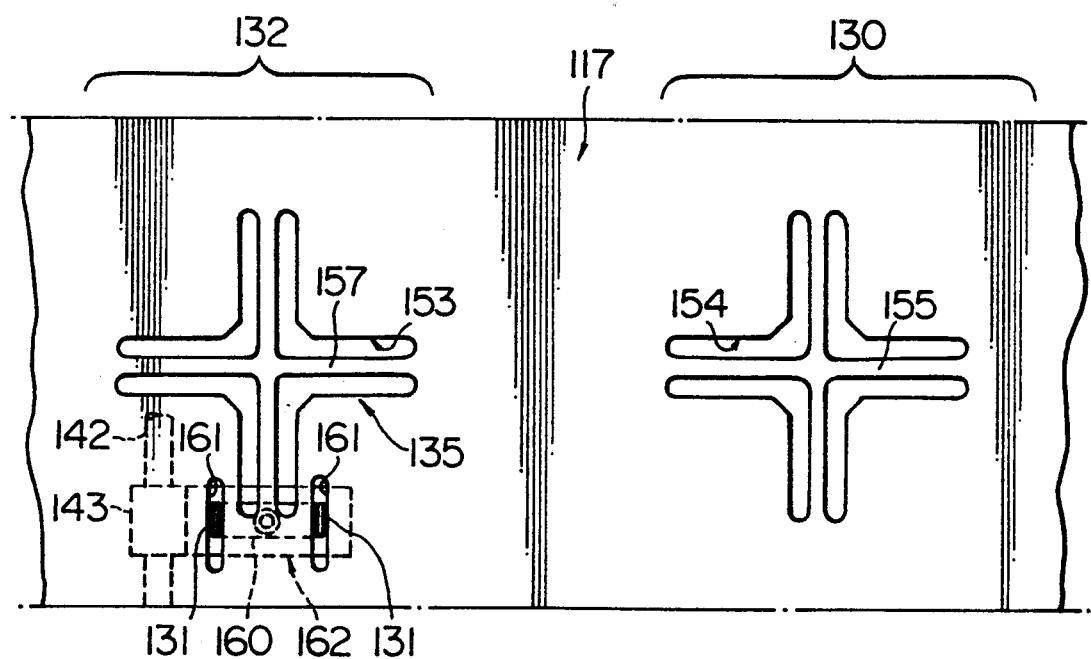
FIG. 24 is a plan view showing article holding positions on an inclined base plate shown in FIG. 19.
Figure 25:
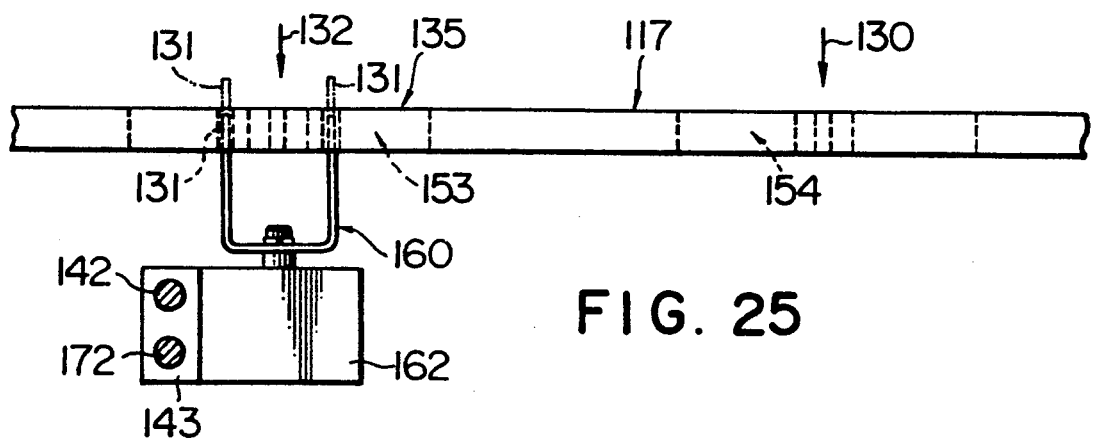
FIG. 25 is an elevational view showing the inclined base plate.

As shown in FIGS. 24 and 25, the first holding position 132 for the first article and the second holding position 130 for the second article are formed with substantially identical perforations of openings 153 and 154. These openings 153 and 154 are made of four L-shaped slits which are arranged in back-to-back relation to leave criss-cross shaped portions 157 and 155.

As shown in FIG. 25, each of the first article stop members 131 is constituted by the upper ends of two legs of a U-shaped member 160, which are slidably received in a pair of parallel slits 161 formed through the inclined plate 117 to freely move up and down as shown by dot-and-dash lines. In the raised position shown by dot-and-dash lines, the stop members 131 arrest the first article R1.

A fluid pressure cylinder 162 is secured to the uppermost one of the slide blocks 143. The fluid cylinder 162 is used to raise and lower the U-shaped members 160 and stop members 131 for the first ring-shaped article.

The details of the upper die 125 will be described with reference to FIGS. 21 to 23. The upper die 125 performs centering and picking up of the second article R2 carried by the transfer means E, overlapping of the second article R2 on the first article R1, and deforming of the first article by means of the deforming means G.

The die 125 has a base board 163 formed with openings 164 for securing the first electromagnets 133, a criss-cross shaped recess 165 formed in the lower surface of the board 113, and a central piston rod receiving opening 166 for passing a piston rod 168a therethrough. A criss-cross shaped operating arm 167 is fit in the recess 165. The piston rod 168a of the fluid pressure cylinder 168 is connected to the center of the operating arm 167 for reciprocating the operating arm 167 up and down. The cylinder 168 is secured to the upper surface of the base board 163.

The main body 169 of the upper die 125 is made up of a circular disc 170 overlapped on the base board 163 and integrally secured thereto by fasteners, centering guide blades 171 including four L-shaped projections 171a which can be inserted through the openings 153 and 154 shown in FIG. 24, and a tapered surface portion 172 provided between the lower surface of the circular disc 170 and the centering guide blades 171. The tapered surface portion 172 extends circumferentially and forms a conical surface for deforming the first ring-shaped article R2.

The L-shaped projections 171a of the centering guide blades 171 have inclined lateral walls 173 respectively, thus forming parts of a frustum. The inclined lateral walls 173 are connected to the inclined surface 172.

The L-shaped projections 171a define a criss-cross shaped groove 174, and the criss-cross shaped portions 155 and 157 (FIG. 24) are caused to engage the criss-cross shaped groove 174. In other words, the centering guide blades 171 of the upper die 169 are inserted into the openings 153 and 154.

The bottom of the criss-cross shaped groove 174 is caused to lie at the same level as the lower surface of the circular plate 170. Thus, the tapered surface portion 172 used for deforming the article is circumferentially continuous except at four short sections cut out. As a consequence, when the deformation is effected as shown in FIG. 42C by using this upper die 125, the periphery will not become a perfect circle. However, this will not cause any problem because the plastic deformation carried out is not a final one and a succeeding final processing will be carried out after the temporary deforming step for semi-assembly.

Figure 21:
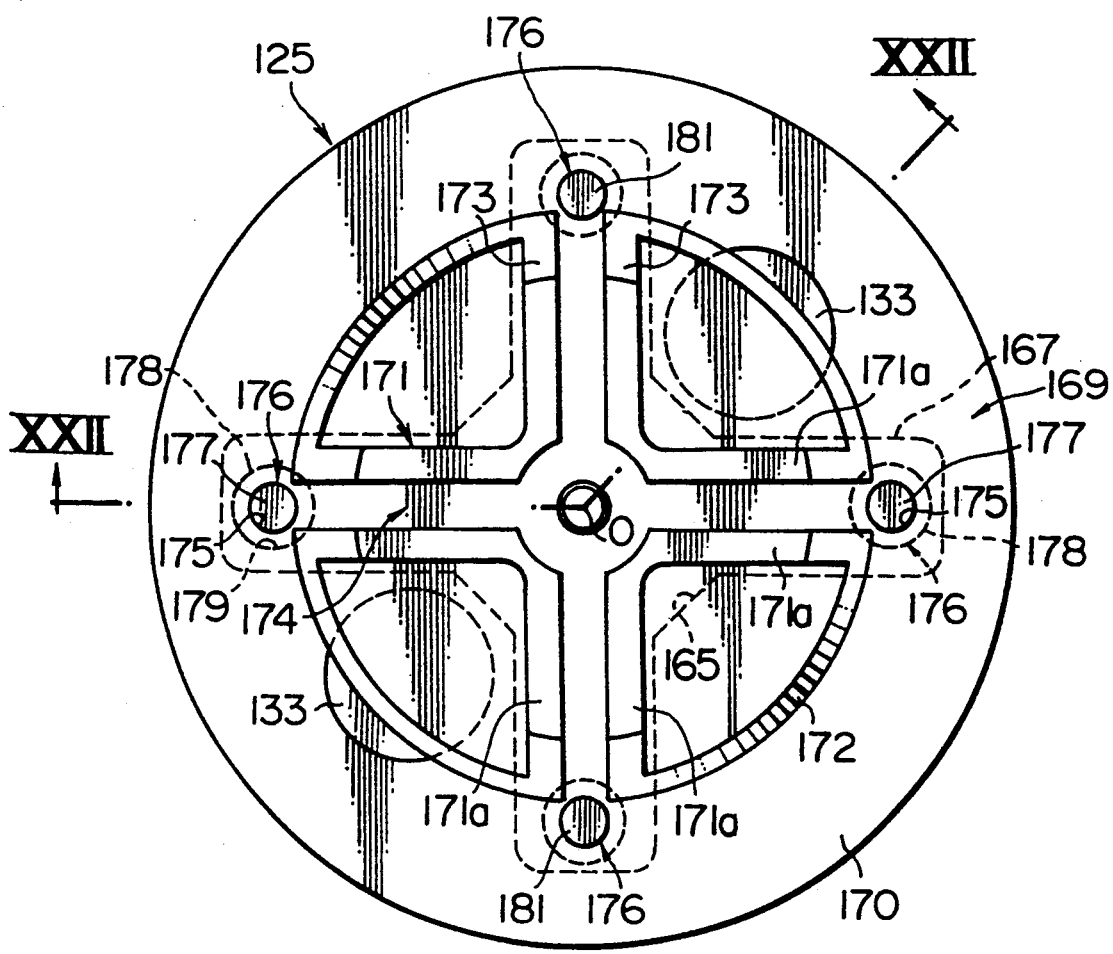
FIG. 21 is a bottom view of an upper die.
Figure 22:
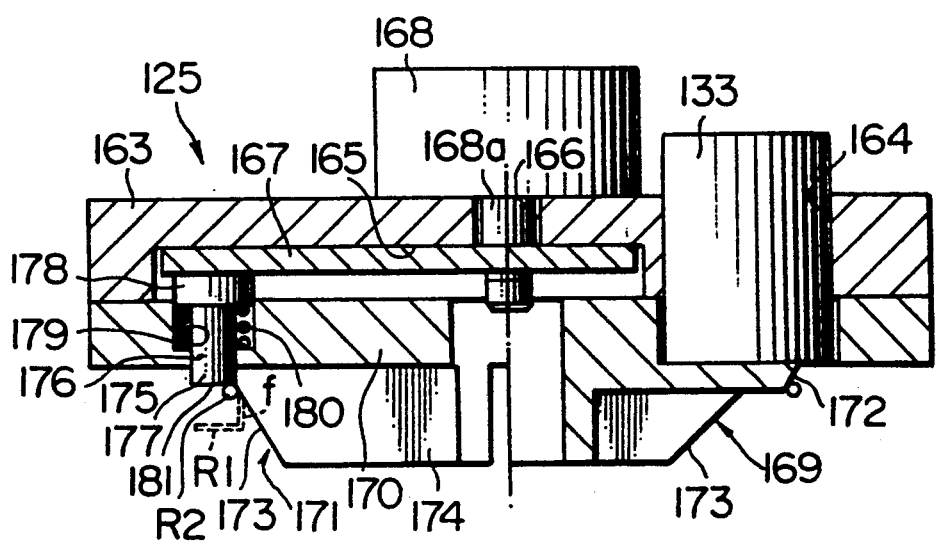
FIG. 22 is a sectional view of the upper die shown in FIG. 21, taken along a line XXII—XXII in FIG. 21.
Figure 23:
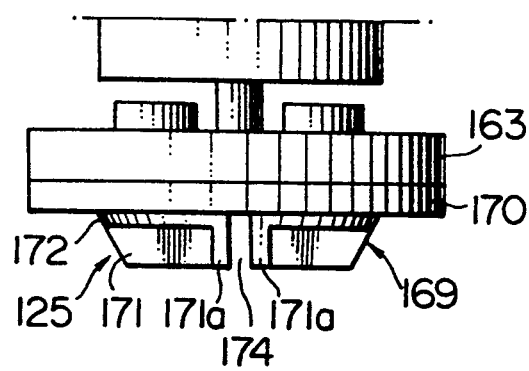
FIG. 23 is a front view showing the upper die.

As shown in FIGS. 21 and 22, circular perforations 175 are formed through the circular disc 170 near the upper wall of the criss-cross shaped groove 174. A reduced diameter stem 177 of a headed rod 176 is inserted into each circular perforation 175 to be slidable in the vertical direction. The head 178 of each rod 176 is located in a hollow chamber constituted by the recess 165 and a recess 179 in the circular plate 170. The head 178 is normally urged upwardly by a coil spring 180 or the like. The lower surfaces of the four ends of the criss-cross shaped operating arm 67 abut against the heads 178 of the rods 176 so that when the piston of the fluid pressure cylinder 168 is moved downwardly against the force of the springs 180, all the rods 176 will be pressed downwardly. Conversely, when the piston is moved upwardly, the heads 178 will be brought to the position shown in FIG. 22, being assisted by the resilient force of the springs 180.

The operation of the semi-assembling apparatus described above is as follows.

When the deforming means G issues a signal requesting the supply of a first article R1, for example, a grommet, a single first ring-shaped article R1 is transferred from the first feed device 106, and the first article R1 slides down by its own weight on the first slide-down passage 119 and the supporting surface 134 and collides against the first article stop members 131 which has been maintained in a projected state by the cylinder 162 shown in FIG. 25. The first article R1 is therefore stopped at the first holding position 132 which is a position substantially equal to the position of the lower die 135.

Then, when a second ring-shaped article R2, for example, a wire ring, is supplied one after another from the second feed device 107, the article R2 slides down by its own weight along the second slide-down supply passage 120 to abut against the second article stopping member 129 and is stopped near the criss-cross shaped portion 155 at the second holding position 130. The position of stop member 129 is not required to accurately coincide with the center of the criss-cross shaped portion 155.

The horizontally movable carriage 122 is located at a position corresponding to the second holding position 130 by the action of the cylinder 123 (see FIG. 19), and the piston of the pneumatic cylinder 124 is moved downwardly. As shown in FIGS. 21 to 23, the upper die 169 is provided with the centering guide blades 171 having tapered lateral surfaces 173. The guide blades 171 are then caused to pass through the second article R2 to be accurately centered while the tapered lateral surfaces 173 are guided by the openings 154 (FIG. 24).

At this time, a major portion of the centering guide blades 171 is inserted into and through the openings 154, while the criss-cross shaped portion 155 is inserted into the criss-cross shaped groove 174 (FIG. 21). Immediately before or during lowering of the upper die 125, the first electromagnets 133 are energized so that the second article R2 made of steel is attracted upward by the magnetic force. As shown in FIG. 22, by retracting the piston of the cylinder 168 to maintain the rods 176 at the raised position by means of the force of the spring 180, the second article R2 will engage the lower surfaces 181 of the rods 176 at positions toward the axis of the die 125 so that the second article R2 can be accurately held with an attitude parallel to the base board 163, that is, in a plane perpendicular to the axis of the die 125.

As above described, since the main body of the upper die 125 is shaped as a frustum having a tapered peripheral surface and since the centering guide blades 171 are constructed to plunge into the openings 154, the second article R2 will be automatically centered and picked up, as shown in FIG. 22. Moreover, by the actions of the tapered surfaces 173, the rod 176 and the first electromagnets 133, the second article R2 can be raised while maintaining an accurate attitude. The upper die 125 is then raised by the cylinder 124 while holding the second article R2.

The carriage 122 is thereafter moved from above the second holding position 130 to a position above the first holder holding position 132 in the transverse direction by the cylinder 123. The carriage 122 is stopped at the position above the first holding position 132 as shown in FIG. 20. The piston of the cylinder 124 is then advanced to lower the upper die 125 toward the lower die 135. The main body 169 of the upper die 125 is provided with centering guide blades 171 having the tapered surfaces 173, while the lower die 135 is formed with the openings 153 for receiving the guide blades 171. Meanwhile, the center of the opening of the first article R1 which has been stopped by the stop member 131 is at approximately the desired position, and the axes of the upper and lower dies are aligned with each other. Therefore, the first and second articles R1 and R2 are caused to be concentric with each other. Thereafter, the first electromagnets 133 are deenergized so that the second article R2 falls down onto the first article R1 and assumes the state shown in FIG. 42B. Immediately before or after the deenergization of the first electromagnets 133, the piston of the cylinder 168 is advanced for projecting the rods 176 downwardly to firmly fit the second article R2 to the first article R1. Then, the piston of the cylinder 168 is retracted to raise the rods 176.

Then, the upper die 125 is lowered by the cylinder 124, and the tapered surfaces 173 of the centering guide blades 171 and the tapered surface 172 engage and press the upright flange f of the first article R2 for plastically deforming the flange f in the direction of the arrow F as shown in FIG. 42C, thereby semi-assembling the articles R1 and R2 to a degree such that the article (wire ring) R2 will not separate away from the article (grommet) R1, thus to obtain a semi-assembled article L.

When the stop members 131 are retracted, the assembled article begins to slide down along the supporting surface 134.

Figure 39A:
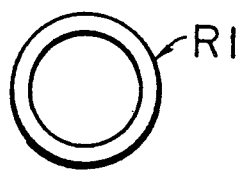
FIGS. 39A through 39D show different first ring-shaped articles, i.e., grommets.
Figure 39B:
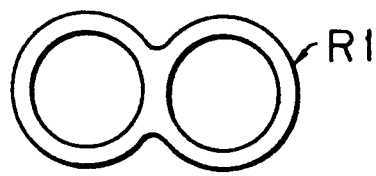

The first article R1, that is, the grommet, can take various shapes. The article R1 may be composed of a single ring or a plurality of rings as shown in FIGS. 39A to 39D. In the case of a grommet having a single ring, the assembled article L is put on a conveyor belt 144 via the slide-down passage 139 and delivered to the next step.

Where the grommet R1 has two rings, as shown in FIG. 39B, a stop member 141a for this grommet has previously been projected upwardly. The stop member 141a immediately stops the assembled article L which has reached the stopping member 141a by sliding-down motion. The position of the stop member 141a is adjustable in the direction of feed corresponding to the dimension of the grommet. In other words, the position of the stop member 141a can be made adjustable by attaching the stop member 141a to the slidable guide shafts 142 and to the cylinder, the position thereof being variable by the slide block 143. Other stop members 141b and 141c are also adjustable in the same manner. In this manner, the centers of the rings of a grommet having two openings can be made to substantially coincide with the center of the lower mold 135.

As above described, while the second ring of a grommet having two openings is stopped at a position corresponding to the lower die, the upper mold 125 is lowered to the second holding position to pick up another second article R2, which is again moved to the first holding position 132 by the transfer means E and caused to overlap the second ring of the first article R1 having two openings. Then the overlapped parts are subjected to the deformation by the deforming means G, thus forming a semi-assembly.

Figure 39C:
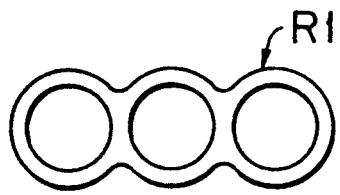
Figure 39D:
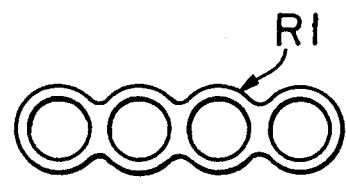

Then the piston is retracted to lower the stop member 141a to discharge the assembled article.

Where the grommet has 3 or 4 rings as shown in FIGS. 39C and 39D, other stopping members 141b and 141c are also used, respectively.

Since the semi-assembling apparatus is constructed as described above, reliable assembling of ring-shaped articles can be performed automatically at high efficiency. Since the supporting surface inclines downwardly, supply and discharge of articles can be made smoothly and efficiently. Furthermore, as it is not necessary to use a handling mechanism, the apparatus can be simplified.

In the apparatus described above, there is provided only one processing head comprising the carriage 122, the cylinder 124, the upper die 125, the cylinder 168 and so on. This single head carries out the operation of picking up the second ring-shaped article R2 at the second holding position 130 as well as the operation of deforming the first ring-shaped article R1 after the second article R2 has been placed on the first article R1.

This type of apparatus having a single processing head is advantageous in that it is simple in construction. However, this type of apparatus has drawbacks in that the picking-up operation of the second ring-shaped articles R2 is not perfectly reliable and that when the first ring-shaped articles R1 are of irregular shape, such as a rounded square shape, the picking-up and deforming operation cannot be carried out by the single head.

In order to overcome the above problems, a modified apparatus for semi-assembling the articles shown in FIGS. 26 to 38 is provided with two processing heads, one for the picking-up operation and the other for the deforming operation. The apparatus shown in FIGS. 26 to 38 has basically the same structure except for the structure of the two heads, only features of the apparatus, different from those of the apparatus previously described, will be described below, with the same parts and devices as those of the previous apparatus designated by the same reference characters as used in FIGS. 18 to 25.

Figure 26:
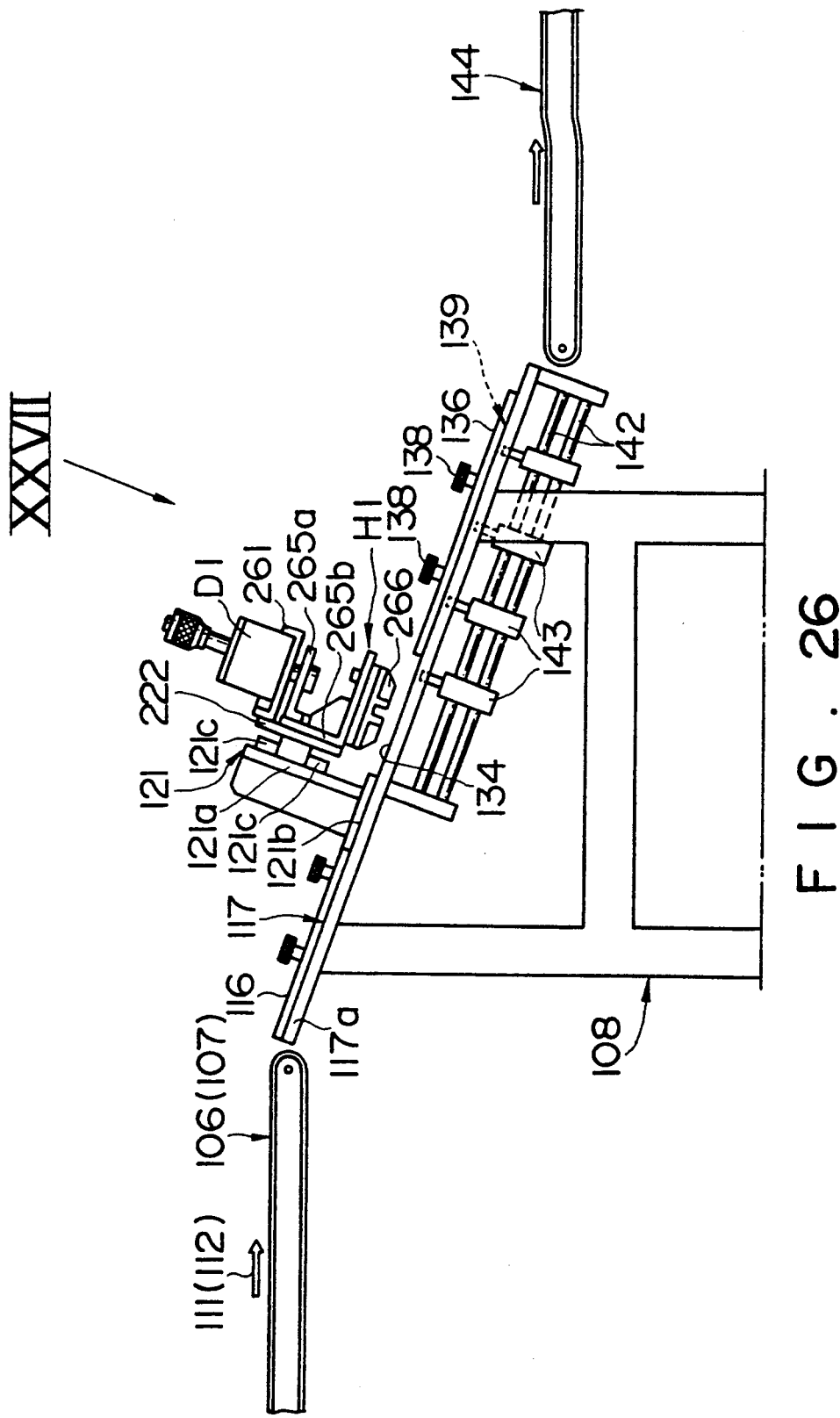
FIG. 26 is a front view showing a modified apparatus for semi-assembling ring-shaped articles.
Figure 27:
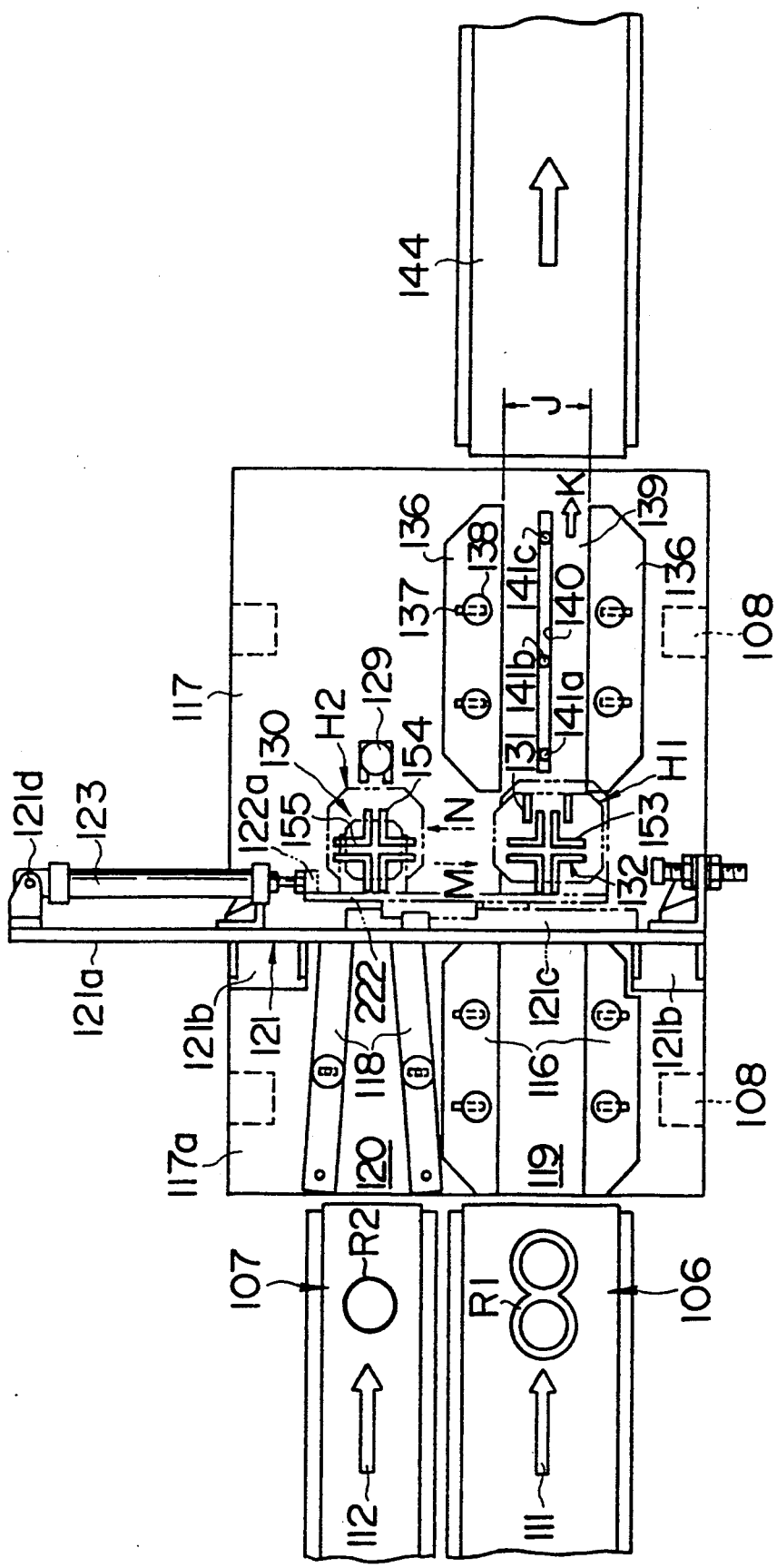
FIG. 27 is a plan view of the apparatus of FIG. 26, as seen in the direction of arrow XXVII in FIG. 26.
Figure 28:
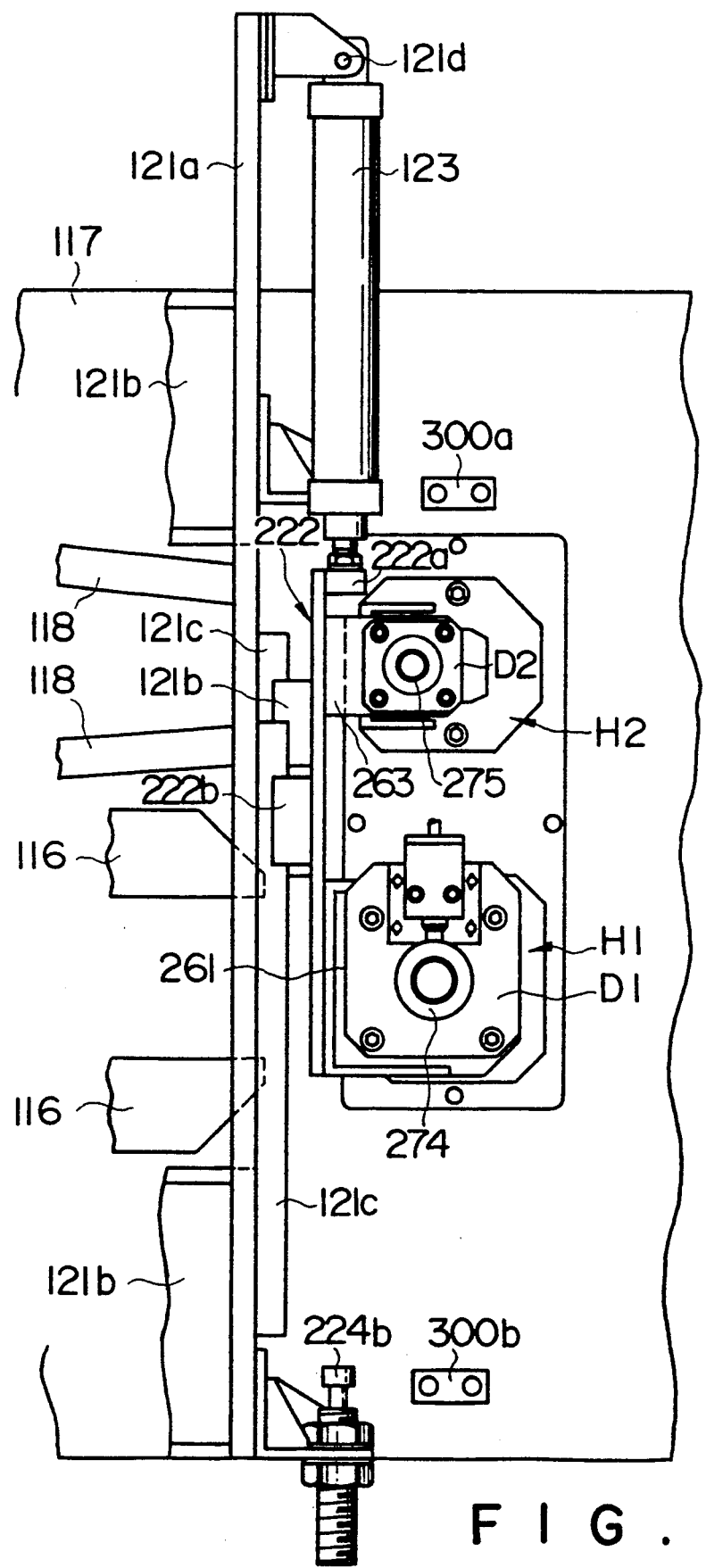
FIG. 28 is an enlarged view of an essential part of FIG. 27.
Figure 29:
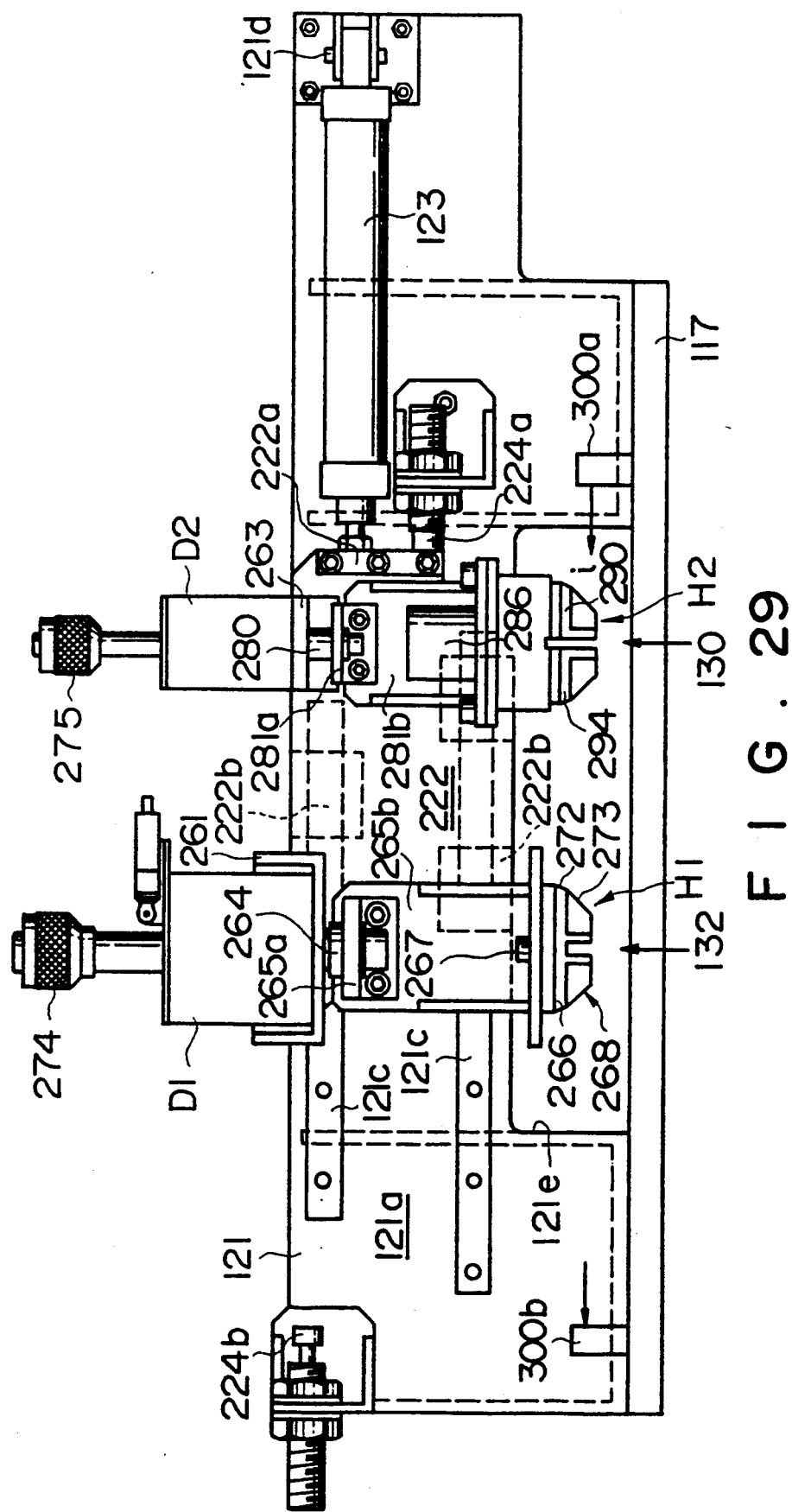
FIG. 29 is a side view as seen from the right in FIG. 28.

As shown in FIGS. 26 and 27, the pedestal 121 extending across and above the inclined base plate 117 has mounted thereon guide rails 121c extending in parallel. These guide rails 121c serve to guide a carriage plate 222 in horizontal sliding motion. As shown in FIGS. 28 and 29, the carriage plate 222 carries sliding blocks 222b slidably gripping the guide rails 121c.

The carriage plate 222 is connected to a driving means, such as a pneumatic cylinder 123 which is pivotally joined at 121d to the pedestal plate 121a. The pneumatic cylinder 123 has its piston rod joined to a bracket 222a fixed to the pedestal plate 121a, whereby the carriage plate 222 can be moved along the guide rails 121c as the piston rod of the cylinder 123 advances and retracts.

As most clearly shown in FIG. 29, the pedestal plate 121a has a lower cutout 121e which allows ring-shaped articles R1 and R2 to pass therethrough. The carriage plate 222 has such dimensions as not to close the cutout 121e.

The carriage plate 222 has mounted thereon first and second processing heads H1 and H2 as shown in FIGS. 28 and 29. The first head H1 operates solely for deforming the first ring-shaped article R1, and the second head H2 operates for picking up the second ring-shaped article R2 and for transferring the picked-up article onto the first article R1. The two heads H1 and H2 are spaced apart horizontally by a distance equal to the horizontal distance between first and second article holding positions 132 and 130. These heads H1 and H2 are positioned directly above the holding positions 132 and 130, respectively, in an initial stage of operation shown in FIG. 29.

The first head H1 and the second head H2 are respectively provided with vertical driving means D1 and D2 which are pneumatic cylinders, for example, disposed at upper portions of the heads. By operating the driving means D1 and D2, the first and second heads H1 and H2 are reciprocated in the vertical direction.

In a normal first position, the first head H1 is located above the first holding position 132 and the second head H2 is located above the second holding position 130. More particularly, as shown in FIG. 29, when the cylinder 123 is in a contracted state, the carriage plate 222 is at the first position shown in FIG. 29, while the first and second heads H1 and H2 are located immediately above the first and second holding positions 132 and 130, respectively, as shown. At this time, the righthand end of the carriage plate 222 abuts against a buffering stop member 224a. When the piston of the cylinder 123 is advanced to cause the lefthand end of the carriage plate 222 to abut against a second buffering stop member 224b (this state will be referred to as a second position), the second head H2 is brought to a position immediately above the first holding position 132. When the piston of the cylinder 123 is retracted, various elements resume the first position shown in FIG. 29.

The first head H1 is constructed as follows. As shown in FIG. 29, the driving device D1 is secured to the carriage plate 222 through mount 261 and contains a downwardly extending piston rod 264. The piston rod 264 is movable downwardly from the position shown in FIG. 29, and its lower end supports the first head H1 through brackets 265a and 265b which combinedly form a laterally U-shaped form as will be noted from FIG. 26. The first head H1 includes a deforming die 266 which is removably fixed to the lower surface of the bracket 265b by bolts 267. On the upper portion of the driving device D1 is provided a knob 274 for adjusting its stroke.

Figure 30:
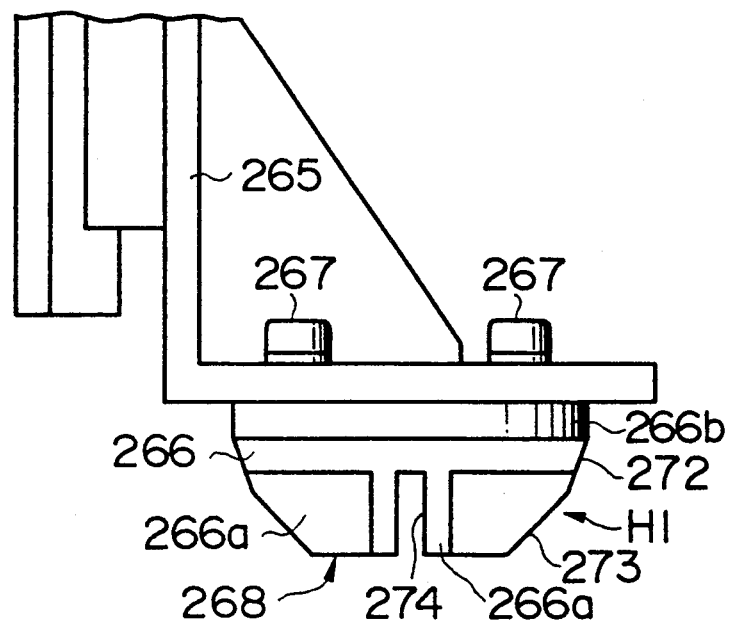
FIG. 30 is an elevation of a die of a first processing head.
Figure 31:
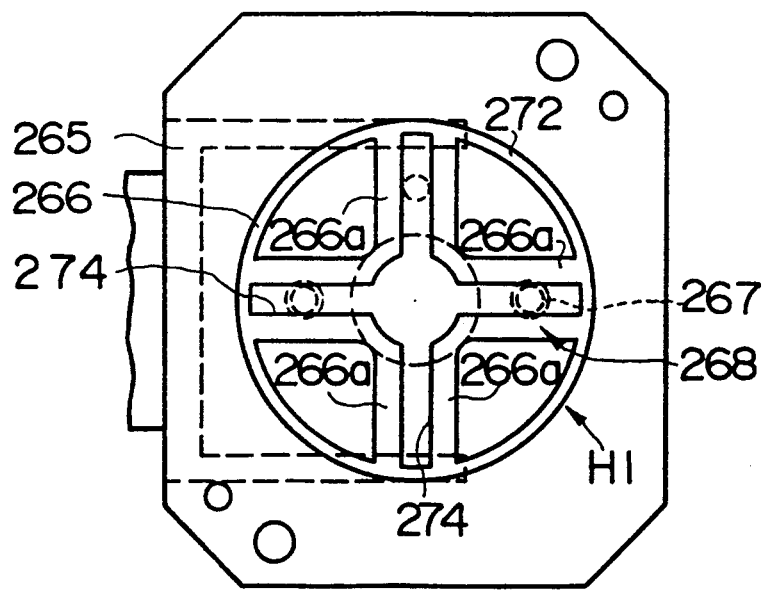
FIG. 31 is a bottom view of the die shown in FIG. 30.

The lower surface of the die 266 is provided with guide blades 268 having four L-shaped insertion ribs or projections 266a as shown in FIG. 30. A tapered deforming peripheral surface 272 is provided directly below a cylindrical mounting portion 266b of the die 266. The outer lateral surfaces of the L-shaped insertion projections 266a of the guide blades 268 form tapered surfaces 273. These tapered surfaces 273 constitute a portion of a frustum and are contiguous to the tapered deforming surface 272. A criss-cross shaped groove is defined between the four L-shaped insertion projections 266a.

Figure 32:
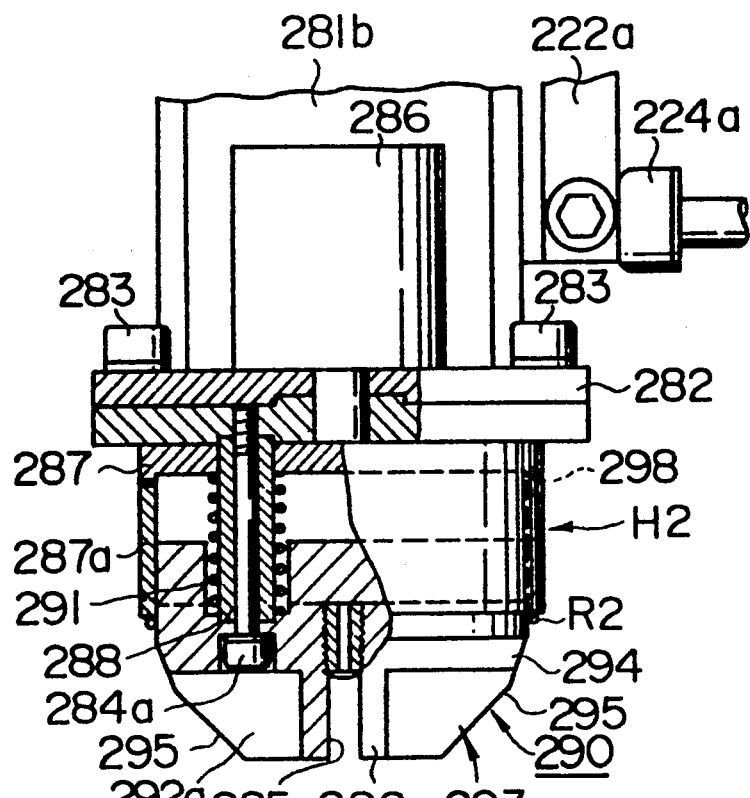
FIG. 32 is a fragmentary elevation of a die of a second processing head.

The driving device D2 of the second head H2 is secured to the carriage plate 222 by a mount 263. The driving device D2 has a downwardly extending piston rod 280. To the lower end of the piston rod 280 is secured the second head H2 through brackets 281a and 281b similar to the brackets 265a and 265b described above. As shown in FIG. 32, the second head H2 has a mounting plate 282 and is removably secured to the lower surface of the bracket 281b by bolts 283 via the mounting plate 282. Bolts 284 each having a head 284a are secured to the lower surface of the mounting plate 282. At the upper portion of the driving device D2 is provided a knob 275 for adjusting its stroke.

A driving device 286, for example, a pneumatic cylinder, is mounted on the mounting plate 282, and a movable plate 287 having an integral cylindrical skirt 287a is secured to the lower end of the piston rod 286a of the driving device 286. A spacer sleeve 288 is fitted about the bolt 284 so that the movable plate 287 can be slidingly moved in the vertical direction under the guidance of the sleeve 288. An article picking-up die 290 is slidably inserted into the inner side of the skirt 287a. The bolts 284 extend through the die 290 and the heads 284a of the bolts 284 retain the die 290 in fixed relation to the mounting plate 282. A coil spring 291 surrounding the sleeve 288 urges the movable plate 287 and the skirt 287a upwardly.

Figure 33:
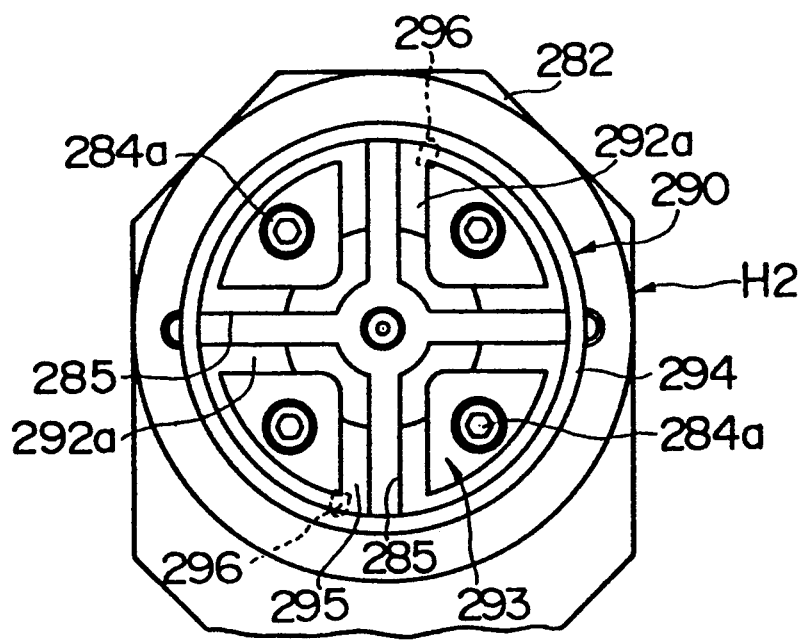
FIG. 33 is bottom view of the die shown in FIG. 32.

In the same manner as the die 266 of the first head H1, the lower end of the die 290 is formed with guide blades 293 consisting of four L-shaped insertion ribs or projections 292a. The guide blades 293 have dimensions and configuration which permit insertion from above of the guide blades 293 into the openings or perforations 153 and 154 as shown in FIG. 24. A criss-cross shaped groove 285 is defined, as also shown in FIG. 33, between the four L-shaped insertion projections 292a.

The periphery of an upper part of the die 290 takes the form of a cylindrical surface, and a tapered peripheral surface 294 for guiding the ring-shaped article R2 is formed adjacent the lower edge of the cylindrical surface of the die 290. Thus, the tapered surface 294 forms a frusto-conical surface. The outer lateral surfaces of the L-shaped insertion projections 292a are tapered surfaces 295. These tapered surfaces 295 form a portion of a frustum whose diameter decreases downwardly and which is contiguous with the tapered surface 294.

In the state of FIG. 32 in which the driving device 286 is not operated, the spring 291 urges the skirt 287a upwardly so a lower part of the cylindrical surface of the die 290 is exposed, which forms an annular stepped portion together with the lower peripheral edge of the skirt 287a. As shown in FIG. 32, the second ring-shaped article R2 is picked up and frictionally fitted to this stepped portion. As shown in FIG. 33, spring-biased press-fit ball plungers 296 are provided so as to project from the cylindrical surface of the die 290. These plungers 296 serve to prevent the article R2 fitted as shown in FIG. 32 from dropping.

As shown in FIG. 32, the upper portion of the skirt 287a is provided with a pair of diametrically opposite light beam transmitting openings 298. A light beam generator 300a which generates a light beam for transmitting through the openings 298 is mounted on the base plate 117, as shown in FIG. 29. As shown by an arrow i, the light beam generator 300a emits light beam in the transverse direction along the surface of the base plate 117. On the opposite side of the base plate 117 is located a light beam sensor 300b. As will be described later, the beam generated by the light beam generator 300a reaches the light beam sensor 300b after passing through the light beam transmitting openings 298 of the second head H2 to issue a signal. The light beam generator 300a, the light beam sensor 300b, and the light beam transmitting openings 298 constitute a head level detecting means which judges whether the second head H2 is at a predetermined height.

Figure 34:
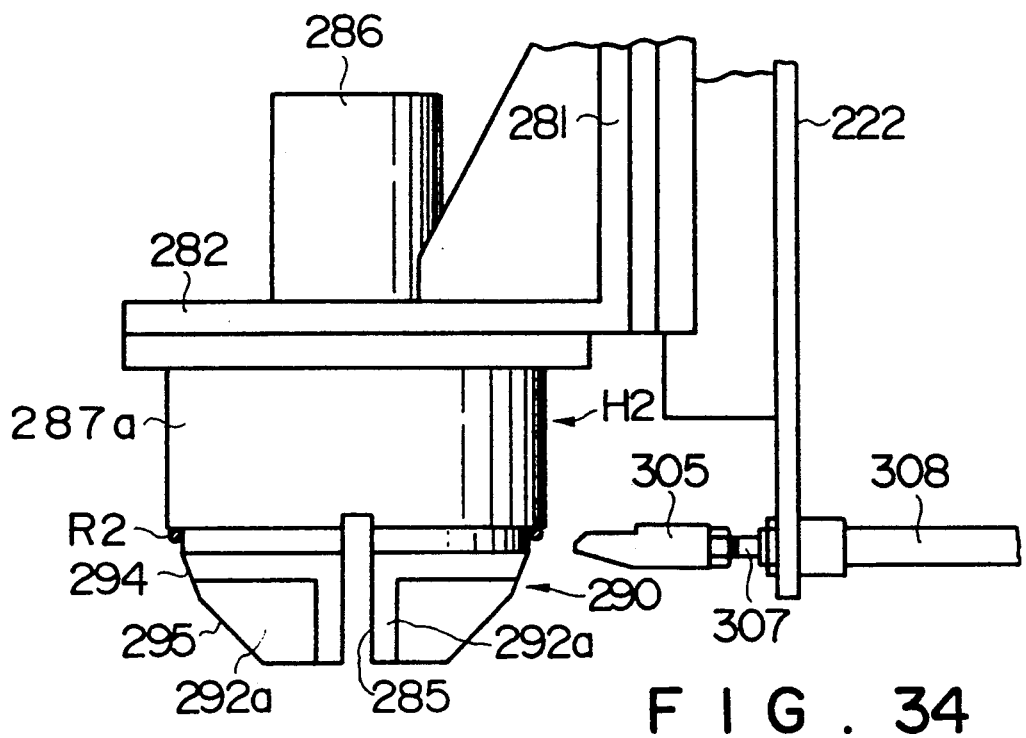
FIG. 34 is a side view of the die of FIG. 32, also showing a detection piece for detecting the state of picking up the ring-shaped articles.

As shown in FIG. 34 showing a view as seen from the righthand side of FIG. 32, a probe or detecting piece 305 is provided. The detecting piece 305 is adjustably supported on a piston rod 307 of a cylinder 308 which is secured to the carriage plate 222. The detecting piece 305 can advance to the left as viewed toward the second head H2. The detecting piece 305 is advanced toward the left (see FIG. 37) by the cylinder 308 to engage the second head H2. Upon engagement, the detecting piece 305 judges whether the second ring-shaped article R2 is present or absent or duplicated. The detecting piece 305 is then retracted toward the fight by the cylinder 308.

Figure 37:
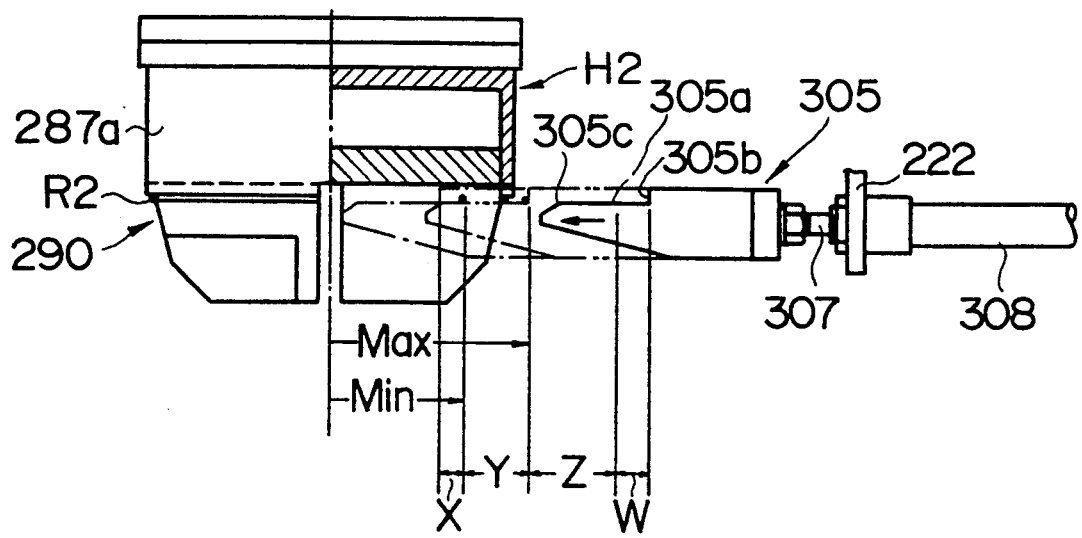
FIG. 37 is a view explanatory of strokes of the detection piece in different states of detection.

As shown in FIG. 37, the detecting piece 305 has a lowered flat portion 305a near its front end, so that a stepped portion 305b is formed. At the front end of the detecting piece 305 is formed a downwardly inclined surface 305c. The height of the lowered flat portion 305a is determined as follows. More particularly, at the time of detection, the level of the lowered portion 305a is made to be equal to the lower surface of the second article R2 fitted on the annular stepped portion formed directly below the lower surface of the skirt 287a as shown in FIG. 34.

The apparatus as described above operates as follows.

When a signal requesting the supply of the first articles R1 is sent, a single first article R1 is supplied from the first supply device 106, and this first article slides down by its own weight along the inclined first supply passage 119 and then abuts against the first stop members 131 which has been projected. The first article R1 is thus maintained at the first holding position 132.

Meanwhile, a second article R2, that is, a wire ring is supplied one by one from the second supply device 107. The second article R2 slides down by its own weight along the second slide-down supply passage 120 to engage the second article stopping member 129 and stops on the criss-cross shaped portion 155 at the second holding position 130. The position of stop not necessarily accurately coincides with the center of the criss-cross shaped portion 155.

At this time, the piston of the cylinder 123 is retracted so that the carriage plate 222 is located at the first position shown in FIGS. 28 and 29 so that the first head H1 is located above the first holding position 132, while the second head H2 is located above the second holding position 130. Both the heads H1 and H2 are at this time at the raised positions as shown in FIG. 29.

Under these conditions, driving devices D1 and D2 operate so that both the heads H1 and H2 begin to descend. As the second head H2 descends, the guide blades 293 (FIG. 32) of the die 290 are inserted into the perforations 154 (FIG. 24) at the second holding position 130, passing through the inside of the second article R2 on the second holding position 130. At this time, the centering of the die 290 is assured by the tapered surfaces 295 (FIG. 32) of the guide blades 293. As the die 290 lowers further, the centering of the second article R2 is also effected by the tapered surfaces 295 of the die so that the second article R2 comes to engage the stepped portion at the lower edge of the skirt 287a, overriding the ball plungers 296, as shown in FIG. 32 and is held on the cylindrical surface of die 290 under small friction.

While the first head H1 also descends concurrently with the second head R2, the operation thereof will be described later.

After the second head H2 has correctly picked up a single second article R2, the head H2 is raised to a height corresponding to the level shown in FIG. 34 and stops. At the same time, the detecting piece 305 is advanced by the cylinder 308. At this time, if a single second article R2 has been correctly picked up as indicated in FIG. 34, the detecting piece 305 can be advanced to a position where its stepped portion 305b (FIG. 37) engages the second article R2. As a consequence, when a detecting device detects that the detecting piece 305 has been advanced to this position, correct picking up of a single second article R2 is confirmed.

Figure 35:
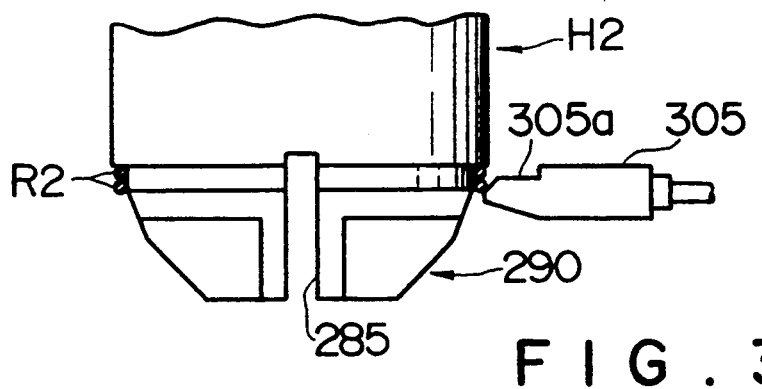
FIG. 35 is a view explanatory of detection of overlapping ring-shaped articles.
Figure 36:
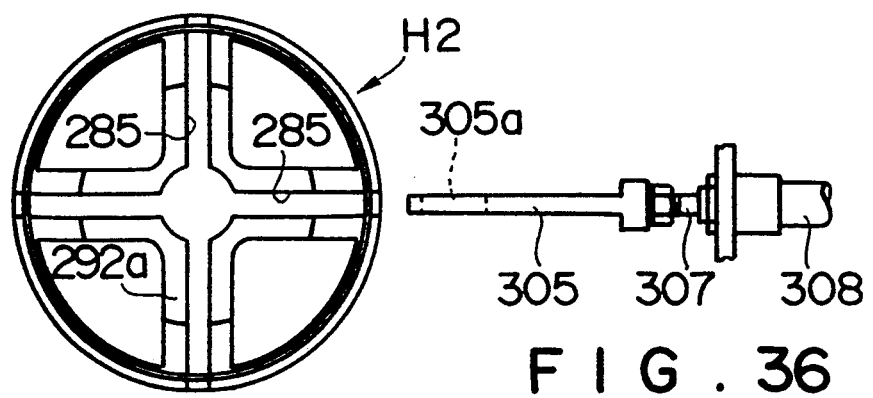
FIG. 36 is a bottom view of FIG. 34.

Furthermore, as shown in FIG. 35, when two second articles R2 have been picked up due to overlapping of two articles, the inclined surface 305c (FIG. 37) of the detecting piece 305 abuts against the second article, and the diameter of advance of..the detecting piece 305 is small. This condition is detected by the detecting device and an alarm is issued.

Where no second article R2 has been picked up, the detecting piece 305 is advanced greatly into the criss-cross groove 285, and this state is detected by the detecting device and an alarm is issued.

In FIG. 37, Max designates a maximum diameter of the exchangeable second head H2, while Min designates a minimum diameter. Under the condition, X represents the range of the stepped portion 305a of the detecting piece 305 when the second article R2 has not been picked up, Y represents the range where a single second article R2 has been correctly picked up and Z represents the range where two or more second articles R2 have been picked up. W indicates a range of starting displacement of the stepped portion 305a.

As above described, after a single second article R2 has been correctly picked up, the piston of the driving device D2 is retracted so that the second head H2 is raised to a position shown in FIG. 29. Furthermore, the first head H1 which has performed a deforming function as will be described hereinafter is also raised to the position shown in FIG. 29 by the driving device D1.

Thereafter, the piston of the cylinder 123 is advanced, so that the carriage plate 222 is moved toward the left as viewed in FIG. 29 along the guide rails 121c. When the lefthand end of the carriage plate 222 comes to abut against the buffer stop member 224b at the second position, the advance of the piston of the cylinder 123 is stopped. At this second position, the second head H2 has been brought to a position above the first holding position 132 while the first head H1 has been moved away from the first holding position 132.

Then, the driving device D2 of the second head H2 is operated to lower the second head H2 again so that the guide blades 293 of the die 290 is inserted into the perforations 153 (FIG. 24) at the first holding position 132. The first article R1 which has stopped at the first holding position 132 is awaiting the next operation. When the die 290 of the second head H2 has been lowered to a position corresponding to that shown in FIG. 38, the cylinder 286 is operated to descend its piston rod 286a against the force of the spring 291. As a result, the skirt 278a as article releasing means is lowered slidingly relative to the cylindrical surface of the die 290, whereby the second article R2 is forced downwardly, overriding the ball plungers 296, and released from the cylindrical surface when the article R2 reaches the tapered surface 294. The second article R2 then falls onto the first article R1 as shown in FIG. 42B. The skirt 287a continues to descend and finally abuts on the second article R2 as shown in FIG. 38.

As above described, the second article R2 is fitted by friction on the cylindrical surface of the die 290, for picking up the article. Furthermore, second article R2 is released from the cylindrical surface of the die 290 by the pushing-down movement of the skirt 287a and permitted to fall down. This operation is more reliable than the operation wherein the second article is picked up and released under magnetic force as has been described before.

Figure 38:
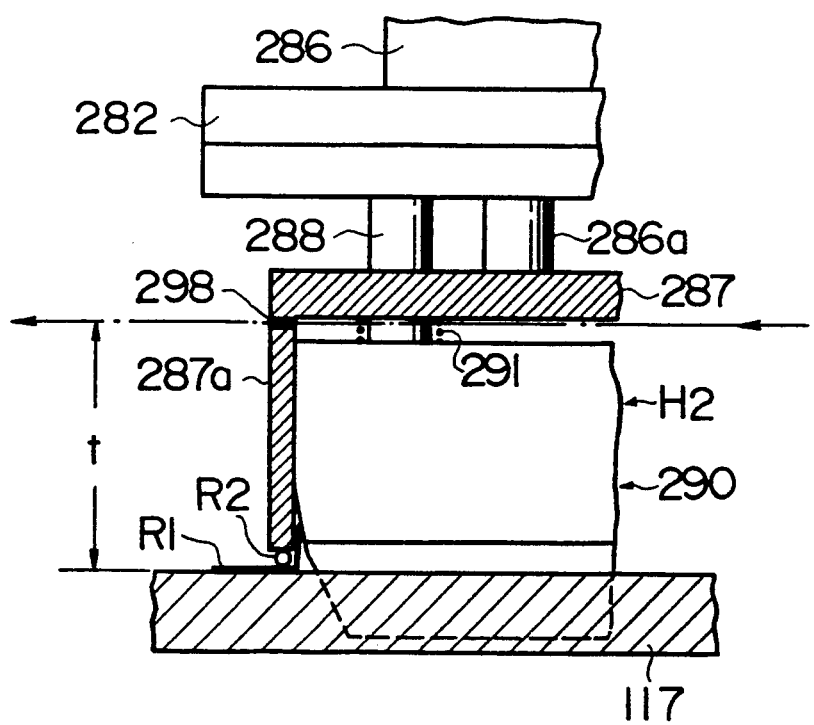
FIG. 38 is a fragmentary view for explaining the detection of correct semi-assembling operation.

When the lower surface of the skirt 287a is in abutment with the second article R2 that is put on the first article R1, the light beam transmitting openings 298 of the skirt 287a take a predetermined height t as shown in FIG. 38 because the combined thickness of the first and second articles R1 and R2 is constant. Therefore, if the height of the light beam to be emitted from the light beam generator 300a (FIG. 29) to the light beam sensor 300b is set to coincide with the height of the openings 298 taken in the condition of FIG. 38, the sensor 300b will detect light beam only when the second article R2 is correctly placed on the first article R1, while when the second article R2 is not correctly placed, the skirt 287a and hence the openings 298 will not take the predetermined height so that the beam will not be detected by the sensor 300b and an alarm will be issued.

After correctly placing the second article R2 on the first article R1, the second head H2 is raised together with the first head, and the cylinder 286 is deactivated so that the skirt 298 returns upwardly by the force of the spring 291. Then, the carriage plate 222 is returned to the first position shown in FIG. 29 by retracting the piston rod of the cylinder 123. Thereafter, by the operations of the driving devices D1 and D2, the first and second heads H1 and H2 are caused to descend again. At this time the first head H1 is lowered toward the first holding position 132, and the die 266 of the head R1 works on the first and second articles on the first holding position 132, which are held in the state shown in FIG. 42B. More particularly, the guide blades 268 of the die 266 are inserted into the perforations 153 (FIG. 24) at the first holding position 132 and then centered by the action of the tapered surfaces 273. Then, the tapered surface 272 for effecting deformation applies a force to the vertical flange f of the first article R1 as shown by arrow F in FIG. 42C for bending the flange f outwardly, whereby the second article R2 is assembled with the first article R1 to a degree not to separate from the second article R2 whereby a semi-assembled article L is obtained.

Concurrently with the lowering of the first head H1, the second head H2 is also lowered for picking up a new article R2. In this manner, deformation and picking up are carried out concurrently, whereby the operating efficiency increases.

Then when the stop members 131 (FIG. 27) are retracted, the semi-assembled article L begins to slide down along the inclined surface by its own weights.

Figure 40:
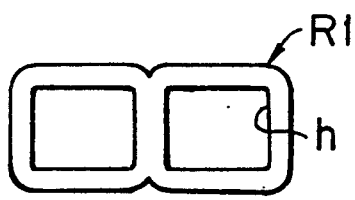
FIG. 40 is a plan view of a grommet having square shape with rounded corners.

FIG. 40 shows a first article or grommet having a different shape. This grommet R1 is not circular but rectangular, so that it is necessary to deform the second article to have a configuration similar to the first article, not in the form of a circular wire ring. By providing the independent dies of the two heads for deformation and for picking up, it becomes possible to process the grommet R1 shown in FIG. 40.

Figure 41:
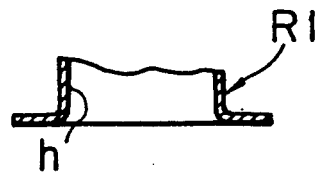
FIG. 41 is a vertical section of a grommet having an irregular flange.

As shown in FIG. 41, the height of the flange h of the first article R1 may not be uniform. In such case, it is difficult to fit the wire ring R2 to the grommet R1, but fitting becomes possible where independent special dies are provided for the two heads.

What is claimed is:

1. An apparatus for assembling ring-shaped articles comprising:

means for supplying first ring-shaped articles one by one to a first delivery end;

means for supplying second ring-shaped articles one by one to a second delivery end;

first article holding means disposed adjacent to said first delivery end for receiving and retaining thereon first ring-shaped articles one at a time;

second article holding means disposed adjacent to said second delivery end for receiving and retaining thereon second ring-shaped articles one at a time;

head means movable between said second and first article holding means for picking up the second ring-shaped article on said second article holding means to transfer the second article so as to place the same onto the first ring-shaped article on the first article holding means in concentrically overlapping relation; and die means movable toward and away from the first article holding means for acting upon the overlapped first and second ring-shaped articles on the first article holding means to deform the first ring-shaped article so as to cause one article to engage the other article, thereby producing an inseparable pair of the first and second articles.

2. The apparatus according to claim 1, wherein said head means is mounted on a carriage movable between a second position adjacent to the second article holding means and a first position adjacent to the first article holding means such that said head means is movable toward and away from said second holding means and said first holding means.

3. The apparatus according to claim 2, wherein said head means has attracting means for attracting and picking up the second ring-shaped article retained on said second article holding means when the head means is moved to the second article holding means, and wherein said head means has releasing means for releasing the second ring-shaped article from the attracting means when the head means is moved to the first article holding means.

4. The apparatus according to claim 3, wherein said attracting means are electromagnets.

5. The apparatus according to claim 3, wherein said releasing means includes rod means movable toward the first article holding means to push the second ring-shaped article away from the head means.

6. The apparatus according to claim 1, wherein said die means is provided on said head means coaxially therewith.

7. The apparatus according to claim 6, wherein said die means has projecting blades on a forward side thereof and wherein said first and second article holding means are formed with openings for slidingly receiving said projecting blades.

8. The apparatus according to claim 7, wherein said projecting blades have tapered outer lateral surfaces for centering the die means relative to said openings.

9. The apparatus according to claim 1, further comprising another head means movable toward and away from the first article holding means, said other head means carrying said die means, said other head means being provided in parallel with said first mentioned head means with a spacing therebetween corresponding to a distance between said first and second article holding means.

10. The apparatus according to claim 9, wherein said first mentioned head means and said other head means are mounted on a carriage movable between a second position at which the first mentioned head means is located above said second article holding means and a first position at which said first mentioned head means is located above said first article holding means and at which said other head means is located away from the first article holding means.

11. The apparatus according to claim 10, wherein said first mentioned head has a second die on a forward side thereof, said second die having an outer peripheral surface for frictionally receiving thereon said second ring-shaped article when the first mentioned head and its second die move into said second article holding means.

12. The apparatus according to claim 11, wherein said second die has releasing means for releasing the second ring-shaped article from said outer peripheral surface thereof when the first mentioned head means is moved toward the first article holding means.

13. The apparatus according to claim 12, wherein said releasing means includes a skirt fitted around said outer peripheral surface and movable toward a forward side of the second die to push the second ring-shaped article on the peripheral surface away therefrom.

14. The apparatus according to claim 13, further comprising means for detecting height of said skirt relative to said first article holding means when the skirt has been moved to abut against the articles on the first article holding means.

15. The apparatus according to claim 11, wherein said other die means has projecting blades on a forward side thereof and said second die has also projecting blades on a forward side thereof, and wherein said first and second article holding means are formed with openings for slidingly receiving both sets of said projecting blades.

16. The apparatus according to claim 15, wherein both sets of said projecting blades have tapered outer lateral surfaces for centering the die means and die relative to said openings.

17. The apparatus according to claim 1, further comprising means for detecting irregular picking up of the second ring-shaped article.

18. The apparatus according to claim 17, wherein said detecting means comprises a detecting piece movable toward said head means to engage the same.

19. The apparatus according to claim 1, wherein each of said means for supplying first ring-shaped articles and means for supplying second ring-shaped articles comprises a horizontal arm for hanging said articles therearound, means for feeding the articles along said horizontal arm, and delivery means provided at an end of said arm to deliver the article one by one.

20. The apparatus according to claim 19, wherein said delivery means is a circular disc having a notch on the periphery thereof, said disc being rotatable to cause said notch to engage the ring-shaped articles on the horizontal arm one by one to deliver them out of the arm.

21. The apparatus according to claim 19, wherein said delivery means comprises a stop member fixed on said one end of said arm to stop the ring-shaped articles being fed on said arm, said stop member having an inclined surface, and a push-up bar projectable upwardly above a highest edge of said inclined surface to raise the articles on the arm one by one to cause the raised articles to slide down the inclined surface.

22. The apparatus according to claim 19, wherein said delivery means comprises a member fixed to said one end of the arm and having an inclined surface, and a projection rod projectable above said inclined surface, said projection rod engaging the articles on said arm by projecting above the inclined surface and retracting downwardly to allow the articles to slide down the inclined surface one by one.

23. The apparatus according to claim 1, further comprising a base plate inclining toward a downstream side, said first and second article holding means being provided on said inclined base plate, and retractable stop means provided downstream of the first and second article holding means to temporarily stop the articles so as not to slide down the inclined base plate.

* * * * *